United States Patent [19]
Fant et al.

[11] Patent Number: 5,907,693
[45] Date of Patent: May 25, 1999

[54] AUTONOMOUSLY CYCLING DATA PROCESSING ARCHITECTURE

[75] Inventors: Karl Fant, Minneapolis; Larry Kinney, Fridley, both of Minn.

[73] Assignee: Theseus Logic, Inc., St. Paul, Minn.

[21] Appl. No.: 08/936,617

[22] Filed: Sep. 24, 1997

[51] Int. Cl.⁶ .................................................. G06F 13/00
[52] U.S. Cl. .................. 395/384; 395/580; 395/800.42; 711/154
[58] Field of Search .................................... 364/230, 104, 364/900, 228.7, 228.8, 230.4, 230.3; 395/575, 800, 425, 384, 580, 800.42; 711/154

[56] References Cited

U.S. PATENT DOCUMENTS

| | | | |
|---|---|---|---|
| 3,715,603 | 2/1973 | Lerch | 326/36 |
| 4,845,633 | 7/1989 | Furtek | 326/38 |
| 5,121,003 | 6/1992 | Williams | 326/121 |
| 5,382,844 | 1/1995 | Knauer | 326/95 |
| 5,506,998 | 4/1996 | Kato et al. | 395/800 |
| 5,673,423 | 9/1997 | Hillis | 395/553 |

FOREIGN PATENT DOCUMENTS

| | | | |
|---|---|---|---|
| 0566739 A1 | 10/1993 | European Pat. Off. | G06G 7/60 |
| 0570584 A1 | 11/1993 | European Pat. Off. | H03K 17/687 |
| 0578821 A1 | 1/1994 | European Pat. Off. | H01L 29/788 |
| WO92/12498 | 7/1992 | WIPO | G06G 7/60 |
| WO92/16971 | 10/1992 | WIPO | H01L 29/788 |
| WO94/03929 | 2/1994 | WIPO | H01L 27/10 |

OTHER PUBLICATIONS

David E. Muller, Asynchronous Logics and Application to Information Processing, Stanford University Press, Switching Theory in Space Technology, pp. 289–297, 1963.

Narinder Pal Singh, A Design Methodology For Self–Timed Systems, Massachusetts Institute of Technology, MIT/LCS/TR–258, Feb. 1981.

T. S. Anatharaman, A Delay Insensitive Regular Expression Recognizer, Dept. of Computer Science, Carnegie–Mellon University, CMU–CS–89–109, Jan. 1989.

Jens Sparso, et al., Design of Delay Insensitive Circuits Using Multi–Ring Structures, European Design Automation Conference, IEEE 0–8186–2780, pp. 15–20, Aug. 1992.

Lawrence G. Heller, et al., Cascode Voltage Switch Logic: A Different CMOS Logic Family, ISSCC 84 Digest of Technical Papers, IEEE, pp. 16–17, Feb. 1984.

Wojcik et al., On the Design of Three Valued Asynchronous Modules, IEEE Transaction on Computers, Oct. 1980, vol. C–29, No. 10, pp. 889–898.

Shibata et al., A Functional MOS Transistor Featuring Gate–Level Weighted Sum and Threshold Operations, IEEE Transactions On Electron Devices, Dec. 1992, vol. 39, No. 6, pp. 1444–1445.

Mark Edward Dean, Strip: A Self–Time Risc Processor, Jun. 1992.

M.R. Greenstreet, T.E. Williams, and J. Staunstrup, Self–Timed Iteration, Elsevier Science Publishers B.V. (North–Holland), IFIP, 1988, pp.309–322.

Teresa H.–Y. Meng, Robert W. Brodersen, and David G. Messerschmitt, Automatic Synthesis of Asynchronous Circuits from High–Level Specifications, IEEE Transactions on Computer–Aided Design, vol. 8, No. 11, Nov. 1989, pp. 1185–1205.

Ted Williams, Latency and Throughput Tradeoffs in Self–Timed Speed–Independent Pipelines and Rings, Stanford University Technical Report No. CSL–TR–91–482, May 1991.

(List continued on next page.)

Primary Examiner—Meng-Ai T. An
Assistant Examiner—John Ciccozzi
Attorney, Agent, or Firm—Steptoe & Johnson LLP

[57] ABSTRACT

An electronic data processing circuit is disclosed having at least an instruction memory, an instruction decoder; and a slot structure. The slot structure is characterized by a plurality of slots. Each slot has at least: (1) an address register (2) a data register, (4) a function register, and (3) a monitoring circuit. Each slot asynchronously performs operations defined by the information content of their respective address register, data register and function register when complete information is present.

19 Claims, 20 Drawing Sheets

OTHER PUBLICATIONS

Jens Sparso and Jorgen Staunstrup, Delay–insensitive multi–ring structures, INTEGRATION, the VLSI Journal 15, 1993, Elsevier Science Publishers B.V., pp. 313–340.

Tzyh–Yung Wuu and Sarma B.K. Vrudhula, A Design of a Fast and Area Efficient Multi–Input Muller C–element, IEEE Transactions on VLSI Systems, vol. 1, No. 2, Jun. 1993, pp. 215–219.

Marc Renaudin and Bachar El Hassan, The Design of Fast Asynchronous Adder Structures and Their Implementation Using D.C.V.S. Logic, Int'l. Symposium on Circuits & Systems, vol. 4, 1994, pp. 291–294.

Richard G. Burford, Xingcha Fan and Neil W. Bergmann, An 180 Mhz 16 bit Multiplier Using Asynchronous Logic Design Techniques, IEEE 1994 Custom Integrated Circuits Conference, pp. 215–218.

Ted Williams, Self–Timed Rings and Their Application to Division, Stanford University Technical Report No. CSL–TR–91–482, May 1991.

Stephen H. Unger, Asynchronous Sequential Switching Circuits, 1969, pp. 221–229.

Carver Mead & Lynn Conway, Introduction to VLSI Systems, 1980, pp. 242–262.

Ivan E. Sutherland, Micropipelines, Communications of the ACM, Dec. 1989, vol. 32, No. 6.

Hampel et al., Threshold Logic, IEEE Spectrum, May 1971, pp. 32–39.

Brzozowski et al,. Asynchronous Circuits—Monographs in Computer Science, Springer–Verlag New York, Inc., 1995, New York, NY.

| INSTRUCTIONS 507 | REG. MAP 503 | | SLOT 509 | Aa | Af | A | Ba | B | Bf | Ra | FUNC |
|---|---|---|---|---|---|---|---|---|---|---|---|
| | REG | SLOT | | | | | | | | | |
| read 5 address 1 | 0 | 0 | 10 | D | add1 | add1 | D | 0 | 0 | 0 | read |
| read 6 address 2 | 1 | 0 | 11 | 0 | 0 | 0 | 0 | 0 | 0 | 0 | 0 |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | 0 | 0 | 0 | 0 | 0 | 0 | 0 |
| mult 5, 9, 9 | 5 | 10Ra | 15 | 0 | 0 | 0 | 0 | 0 | 0 | 0 | 0 |
| add 5, 5, 5 | 6 | 0 | 16 | 0 | 0 | 0 | 0 | 0 | 0 | 0 | 0 |
| sub 5, 8, 10 | 7 | 0 | 17 | 0 | 0 | 0 | 0 | 0 | 0 | 0 | 0 |
| write 10 address 5 | 8 | 0 | 18 | 0 | 0 | 0 | 0 | 0 | 0 | 0 | 0 |
| write 9 address 6 | 9 | 0 | 19 | 0 | 0 | 0 | 0 | 0 | 0 | 0 | 0 |
| read 9 address 7 | 10 | 0 | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 8A

| INSTRUCTIONS | REG. MAP | | SLOTS | | | | | | | | |
|---|---|---|---|---|---|---|---|---|---|---|---|
| | REG | SLOT | SLOT | Aa | A | Af | Ba | B | Bf | Ra | FUNC |
| read 5 address 1 | 0 | 0 | 10 | D | add1 | add1 | D | 0 | 0 | 0 | read |
| read 6 address 2 | 1 | 0 | 11 | D | add2 | add2 | D | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | 0 | 0 | 0 | 0 | 0 | 0 | 0 |
| mult 5, 9, 9 | 5 | 10Ra | 15 | 0 | 0 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 0 | 17 | 0 | 0 | 0 | 0 | 0 | 0 | 0 | 0 |
| write 10 address 5 | 8 | 0 | 18 | 0 | 0 | 0 | 0 | 0 | 0 | 0 | 0 |
| write 9 address 6 | 9 | 0 | 19 | 0 | 0 | 0 | 0 | 0 | 0 | 0 | 0 |
| read 9 address 7 | 10 | 0 | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 8B

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | D | add1 | add1 | D | 0 | 0 | 0 | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 0 | read |
| read 8 address 4 | 3 | 0 | 13 | 0 | 0 | 0 | 0 | 0 | 0 | 0 | 0 |
| add 7, 8, 9 | 4 | 0 | 14 | 0 | 0 | 0 | 0 | 0 | 0 | 0 | 0 |
| mult 5, 9, 9 | 5 | 10Ra | 15 | 0 | 0 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 12Ra | 17 | 0 | 0 | 0 | 0 | 0 | 0 | 0 | 0 |
| write 10 address 5 | 8 | 0 | 18 | 0 | 0 | 0 | 0 | 0 | 0 | 0 | 0 |
| write 9 address 6 | 9 | 0 | 19 | 0 | 0 | 0 | 0 | 0 | 0 | 0 | 0 |
| read 9 address 7 | 10 | 0 | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 8C

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | D | add1 | add1 | D | 0 | 0 | 0 | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 0 | read |
| read 8 address 4 | 3 | 0 | 13 | D | add4 | add4 | D | 0 | 0 | 0 | read |
| add 7, 8, 9 | 4 | 0 | 14 | 0 | 0 | 0 | 0 | 0 | 0 | 0 | 0 |
| mult 5, 9, 9 | 5 | 10Ra | 15 | 0 | 0 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 12Ra | 17 | 0 | 0 | 0 | 0 | 0 | 0 | 0 | 0 |
| write 10 address 5 | 8 | 13Ra | 18 | 0 | 0 | 0 | 0 | 0 | 0 | 0 | 0 |
| write 9 address 6 | 9 | 0 | 19 | 0 | 0 | 0 | 0 | 0 | 0 | 0 | 0 |
| read 9 address 7 | 10 | 0 | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | D | add1 | add1 | D | 0 | 0 | 0 | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 14A | read |
| read 8 address 4 | 3 | 0 | 13 | D | add4 | add4 | D | 0 | 0 | 14B | read |
| add 7, 8, 9 | 4 | 0 | 14 | 0 | 0 | 0 | 0 | 0 | 0 | 0 | add |
| mult 5, 9, 9 | 5 | 10Ra | 15 | 0 | 0 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 14A | 17 | 0 | 0 | 0 | 0 | 0 | 0 | 0 | 0 |
| write 10 address 5 | 8 | 14B | 18 | 0 | 0 | 0 | 0 | 0 | 0 | 0 | 0 |
| write 9 address 6 | 9 | 14Ra | 19 | 0 | 0 | 0 | 0 | 0 | 0 | 0 | 0 |
| read 9 address 7 | 10 | 0 | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 8F

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | D | add1 | add1 | D | 0 | 0 | 15A | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 14A | read |
| read 8 address 4 | 3 | 0 | 13 | D | add4 | add4 | D | 0 | 0 | 14B | read |
| add 7, 8, 9 | 4 | 0 | 14 | 0 | 0 | 0 | 0 | 0 | 0 | 15B | add |
| mult 5, 9, 9 | 5 | 15A | 15 | 0 | 0 | 0 | D | 0 | 0 | 0 | mult |
| add 5, 5, 5 | 6 | 11Ra | 16 | 0 | 0 | 0 | 0 | 0 | 0 | 0 | 0 |
| sub 5, 8, 10 | 7 | 14A | 17 | 0 | 0 | 0 | 0 | 0 | 0 | 0 | 0 |
| write 10 address 5 | 8 | 14B | 18 | 0 | 0 | 0 | 0 | 0 | 0 | 0 | 0 |
| write 9 address 6 | 9 | 15Ra | 19 | 0 | 0 | 0 | 0 | 0 | 0 | 0 | 0 |
| read 9 address 7 | 10 | 0 | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | D | add1 | add1 | D | 0 | 0 | 15A | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 14A | read |
| read 8 address 4 | 3 557 | 0 | 13 | D 561 | add4 | add4 | D | 0 | 0 | 14B | read |
| add 7, 8, 9 | 4 | 0 | 14 | 0 | 0 | 0 | 0 | 0 | 0 | 15B | add |
| mult 5, 9, 9 | 5 | 16Ra | 15 | 16A | 0 | 0 | D | 0 | 0 | 0 | mult |
| add 5, 5, 5 | 6 | 11Ra | 16 | 16B | 0 | 0 | D | 0 | 0 | 0 | add |
| sub 5, 8, 10 | 7 | 14A | 17 | 0 | 0 | 0 | 0 563 | 0 | 0 | 0 | 0 |
| write 10 address 5 | 8 | 14B | 18 | 0 559 | 0 | 0 | 0 | 0 | 0 | 0 | 0 553 |
| write 9 address 6 | 9 | 15Ra | 19 | 0 | 0 | 0 | 0 | 0 | 0 | 0 | 0 |
| read 9 address 7 | 10 | 0 | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 8G

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | D | add1 | add1 | D | 0 | 0 | 15A | read |
| read 6 address 2 | 1 | 0 | 11 | D | add2 | add2 | D | 0 | 0 | 0 | read |
| read 7 address 3 | 2 | 0 | 12 | D | add3 | add3 | D 569 | 0 | 0 | 14A | read |
| read 8 address 4 | 3 571 | 0 | 13 | D | add4 | add4 | D | 0 | 0 | 14B | read |
| add 7, 8, 9 | 4 | 0 | 14 | 0 | 0 | 0 | 17B | 0 | 0 | 15B | add |
| mult 5, 9, 9 | 5 | 17A | 15 | 16A | 0 | 0 | D | 0 | 0 567 0 | mult |
| add 5, 5, 5 | 6 575 | 11Ra | 16 | 16B | 0 | 0 | D | 0 | 0 | 17A | add |
| sub 5, 8, 10 | 7 575 | 14A | 17 | 0 | 0 | 0 | 0 | 0 | 0 | 0 | sub |
| write 10 address 5 | 8 | 17B | 18 | 0 | 0 | 0 | 0 | 0 | 0 | 0 | 0 565 |
| write 9 address 6 | 9 | 15Ra | 19 | 0 | 0 | 0 | 0 | 0 | 0 | 0 | 0 |
| read 9 address 7 | 10 | 17Ra | 20 | 0 | 0 | 0 | 0 | 0 | 0 | 0 | 0 |
| add 5, 8, 9 | 11 | 0 | 21 | 0 | 0 | 0 | 0 | 0 | 0 | 0 | 0 |
| write 9 address 8 | 12 | 0 573 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

| INSTRUCTIONS | REG. MAP REG | SLOT |
|---|---|---|
| read 5 address 1 | 0 | 0 |
| read 6 address 2 | 1 | 0 |
| read 7 address 3 | 2 | 0 |
| read 8 address 4 | 3 | 0 |
| add 7, 8, 9 | 4 | 0 |
| mult 5, 9, 9 | 5 | 17A |
| add 5, 5, 5 | 6 | 11Ra |
| sub 5, 8, 10 | 7 | 14A |
| write 10 address 5 | 8 587 | 17B |
| write 9 address 6 | 9 | 15Ra |
| read 9 address 7 | 10 | (18B) |
| add 5, 8, 9 | 11 | 0 |
| write 9 address 8 | 12 | 0 |
| | 13 | 0 |
| | 14 | 0 |
| | 15 | 0 |

| SLOT | Aa | A | Af | Ba | B | Bf | Ra | FUNC |
|---|---|---|---|---|---|---|---|---|
| 10 | D | add1 | add1 | D | 0 | 0 | 15A | read |
| 11 | D | add2 | add2 | D | 0 | 0 | 0 | read |
| 12 | D | add3 | add3 | D | 0 | 0 | 14A | read |
| 13 | D | add4 | add4 | D | 0 | 0 | 14B | read |
| 14 | 0 | 0 | 0 | 17B | 0 | 0 | 15B | add |
| 15 | 16A | 0 | 0 | D | 0 | 0 585 | 0 | mult |
| 16 | 16B | 0 | 0 583 | D | 0 | 0 | 17A | add |
| 17 | 0 | 0 | 0 | 0 | 0 | 0 | (18B) | sub |
| 18 | (D) | (add5) | (add5) | 0 | 0 | 0 | (D) | (write) |
| 19 | 0 | 0 | 0 | 0 | 0 | 0 589 | 0 | 0 |
| 20 | 0 | 0 583 | 0 | 0 | 0 | 0 589 | 0 | 0 581 |
| 21 | 0 | 0 | 0 | 0 | 0 | 0 | 0 | 0 |
| 22 | 0 | 0 | 0 | 0 | 0 | 0 | 0 | 0 |
| 23 | 0 | 0 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |

FIG. 8J

| INSTRUCTIONS | REG. MAP REG | SLOT |
|---|---|---|
| read 5 address 1 | 0 | 0 |
| read 6 address 2 | 1 | 0 |
| read 7 address 3 | 2 | 0 |
| read 8 address 4 | 3 | 0 |
| add 7, 8, 9 | 4 | 0 |
| mult 5, 9, 9 | 5 | 17A |
| add 5, 5, 5 | 6 | 11Ra |
| sub 5, 8, 10 | 7 597 | 14A |
| write 10 address 5 | 8 | 17B |
| write 9 address 6 | 9 | (19B) |
| read 9 address 7 | 10 | 18B |
| add 5, 8, 9 | 11 | 0 |
| write 9 address 8 | 12 | 0 |
| | 13 | 0 |
| | 14 | 0 |
| | 15 | 0 |

| SLOT | Aa | A | Af | Ba | B | Bf | Ra | FUNC |
|---|---|---|---|---|---|---|---|---|
| 10 | D | add1 | add1 | D | 0 | 0 | 15A | read |
| 11 | D | add2 | add2 | D | 0 | 0 | 0 | read |
| 12 | D | add3 | add3 | D | 0 | 0 | 14A | read |
| 13 | D | add4 | add4 | D | 0 | 0 595 | 14B | read |
| 14 | 0 | 0 | 0 | 17B | 0 | 0 595 | 15B | add |
| 15 | 16A | 0 | 0 | D | 0 | 0 | (19B) | mult |
| 16 | 16B | 0 | 0 | D | 0 | 0 | 17A | add |
| 17 | 0 599 | 0 | 0 | 0 | 0 | 0 | 18B | sub |
| 18 | D | add5 | add5 | 0 | 0 | 0 | D | write |
| 19 | (D) | (add6) | (add6) | 0 | 0 | 0 | (D) | (write) |
| 20 | 0 | 0 | 0 | 0 | 0 | 0 592 | 0 | 0 |
| 21 | 0 | 0 593 | 0 593 | 0 | 0 | 0 592 | 0 | 0 591 |
| 22 | 0 | 0 | 0 | 0 | 0 | 0 | 0 | 0 |
| 23 | 0 | 0 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |

FIG. 8K

| INSTRUCTIONS | REG. MAP | | SLOTS | | | | | | | |
|---|---|---|---|---|---|---|---|---|---|---|
| | REG | SLOT | SLOT | Aa | A | Af | Ba | B | Bf | Ra | FUNC |
| read 5 address 1 | 0 | 0 | 10 | D | add1 | add1 | D | 0 | 0 | 15A | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 14A | read |
| read 8 address 4 | 3 | 0 | 13 | D | add4 | add4 | D | 0 | 0 | 14B | read |
| add 7, 8, 9 | 4 | 0 | 14 | 0 | 0 | 0 | 17B | 0 | 0 | 15B | add |
| mult 5, 9, 9 | 5 | 17A | 15 | 16A | 0 | 0 | D | 0 | 0 | 19B | mult |
| add 5, 5, 5 | 6 | 11Ra | 16 | 16B | 0 | 0 | D | 0 | 0 | 17A | add |
| sub 5, 8, 10 | 7 *609* | 14A | 17 | 0 | 0 | 0 | 0 | 0 | 0 | 18B | sub |
| write 10 address 5 | 8 | 17B | 18 | D | add5 | add5 | 0 | 0 | 0 | D | write |
| write 9 address 6 | 9 | (20Ra) | 19 | D | add6 | add6 | D | 0 | 0 | D | write |
| read 9 address 7 | 10 | 18B | 20 | (D) | 0 | (add7 | D) | 0 | 0 | 0 | (read) |
| add 5, 8, 9 | 11 | 0 | 21 | 0 *607* | 0 | 0 *603* | 0 *605* | 0 | 0 | 0 | 0 *601* |
| write 9 address 8 | 12 | 0 | 22 | 0 | 0 | 0 | 0 | 0 | 0 | 0 | 0 |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 8L

| INSTRUCTIONS | REG. MAP | | SLOTS | | | | | | | |
|---|---|---|---|---|---|---|---|---|---|---|
| | REG | SLOT | SLOT | Aa | A | Af | Ba | B | Bf | Ra | FUNC |
| read 5 address 1 | 0 | 0 | 10 | D | add1 | add1 | D | 0 | 0 | 15A | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 14A | read |
| read 8 address 4 | 3 *617* | 0 | 13 | D | add4 | add4 | D | 0 | 0 | 14B | read |
| add 7, 8, 9 | 4 | 0 | 14 | 0 | 0 | 0 | 17B | 0 | 0 | 15B | add |
| mult 5, 9, 9 | 5 | (21A) | 15 | 16A | 0 | 0 | D | 0 | 0 | 19B | mult |
| add 5, 5, 5 | 6 *619* | 11Ra | 16 | 16B | 0 | 0 | D | 0 | 0 | 17A | add |
| sub 5, 8, 10 | 7 | 14A | 17 | (21A) | 0 | 0 | (21B) | 0 | 0 | 18B | sub |
| write 10 address 5 | 8 | (21B) | 18 | D | add5 | add5 | 0 | 0 | 0 | D | write |
| write 9 address 6 | 9 | (21Ra) | 19 | D *613* | add6 | add6 | D *615* | 0 | 0 *621* | D | write |
| read 9 address 7 | 10 | 18B | 20 | D | 0 | add7 | D | 0 | 0 | (D) | read |
| add 5, 8, 9 | 11 | 0 *623* | 21 | 0 | 0 | 0 | 0 | 0 | 0 | 0 | (add) |
| write 9 address 8 | 12 | 0 | 22 | 0 | 0 | 0 | 0 | 0 | 0 | 0 | 0 *611* |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

| INSTRUCTIONS | REG. MAP | | | SLOTS | | | | | | | |
|---|---|---|---|---|---|---|---|---|---|---|---|
| | REG | SLOT | SLOT | Aa | A | Af | Ba | B | Bf | Ra | FUNC |
| read 5 address 1 | 0 | 0 | 10 | D | add1 | add1 | D | 0 | 0 | 15A | read |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 14A | read |
| read 8 address 4 | 3 | 0 | 13 | D | add4 | add4 | D | 0 | 0 | 14B | read |
| add 7, 8, 9 | 4 | 0 | 14 | 0 | 0 | 0 | 17B | 0 | 0 | 15B | add |
| mult 5, 9, 9 | 5 | 21A | 15 | 16A | 0 | 0 | D | 0 | 0 | 19B | mult |
| add 5, 5, 5 | 6 | 11Ra | 16 | 16B | 0 | 0 | D | 0 | 0 | 17A | add |
| sub 5, 8, 10 | 7 | 633 14A | 17 | 21A | 0 | 0 | 21B | 0 | 0 | 18B | sub |
| write 10 address 5 | 8 | 21B | 18 | D | add5 | add5 | 0 | 0 | 0 | D | write |
| write 9 address 6 | 9 | (22B) | 19 | D | add6 | add6 | D | 0 | 0 631 | D | write |
| read 9 address 7 | 10 | 18B | 20 | D 629 | 0 | add7 | D | 0 | 0 | D | read |
| add 5, 8, 9 | 11 | 0 | 21 | 0 | 0 | 0 | 0 | 0 | 0 | (22B) | add |
| write 9 address 8 | 12 | 0 | 22 | (D) | (add8 | add8) 0 | 0 | 0 | 0 | (D) | (write) |
| | 13 | 0 | 23 | 0 | 0 | 0 | 0 | 0 | 0 | 0 | 0 |
| | 14 | 0 | 24 | 0 | 0 627 0 | 0 | 0 | 0 | 0 635 0 | 0 625 |
| | 15 | 0 | 25 | 0 | 0 | 0 | 0 | 0 | 0 | 0 | 0 |

SLOT 10

| INSTRUCTIONS | REG. MAP REG | REG. MAP SLOT | SLOT | Aa | A | Af | Ba | B | Bf | Ra | FUNC |
|---|---|---|---|---|---|---|---|---|---|---|---|
| read 5 address 1 | 0 | 0 | 10 | ⓪ | 0 | 0 | ⓪ | 0 | 0 | ⓪ | ⓪ |
| read 6 address 2 | 1 | 0 | 11 | D | add2 | add2 | D | 0 | 0 | 0 | read |
| read 7 address 3 | 2 | 0 | 12 | D | add3 | add3 | D | 0 | 0 | 14A | read |
| read 8 address 4 | 3 | 0 | 13 | D 711 | add4 | add4 | D | 0 | 0 | 14B | read |
| add 7, 8, 9 | 4 | 0 | 14 | 0 | 0 | 0 | 17B | 0 | 0 | 15B | add |
| mult 5, 9, 9 | 5 | 21A | 15 | 16A | reg5 | reg5 | D | 0 | 0 | 19B | mult |
| add 5, 5, 5 | 6 | 11Ra | 16 | 16B | 0 | 0 | D | 0 | 0 | 17A | add |
| sub 5, 8, 10 | 7 | 14A | 17 | 21A | 0 | 0 | 21B | 0 | 0 | 18B | sub |
| write 10 address 5 | 8 | 21B | 18 | D | add5 | add5 | 0 | 0 | 0 | D | write |
| write 9 address 6 | 9 | 22B | 19 | D | add6 | add6 | 0 | 0 | 0 | D | write |
| read 9 address 7 | 10 | 18B | 20 | D | 0 | add7 | D | 0 | 0 | D | read |
| add 5, 8, 9 | 11 | 0 | 21 | 0 | 0 | 0 | 0 | 0 | 0 | 22B | add |
| write 9 address 8 | 12 | 0 | 22 | D | add8 | add8 | 0 | 0 | 0 | D | write |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

SLOT 12

| INSTRUCTIONS | REG. MAP REG | REG. MAP SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 715 | 0 | 0 | 0 717 | 0 | 0 719 | 0 721 | 0 |
| read 6 address 2 | 1 | 0 | 11 | D | add2 | add2 | D | 0 | 0 | 0 | read |
| read 7 address 3 | 2 | 0 | 12 | ⓪ | 0 | 0 | ⓪ | 0 | 0 | ⓪ | ⓪ |
| read 8 address 4 | 3 | 0 | 13 | D 714 | add4 | add4 | D 723 | 0 | 0 | 14B | read |
| add 7, 8, 9 | 4 | 0 | 14 | 0 | reg7 | reg7 | 17B | 0 | 0 | 15B | add |
| mult 5, 9, 9 | 5 | 21A | 15 | 16A | reg5 | reg5 | D | 0 | 0 | 19B | mult |
| add 5, 5, 5 | 6 | 11Ra | 16 | 16B | 0 | 0 | D | 0 | 0 | 17A | add |
| sub 5, 8, 10 | 7 | 14A | 17 | 21A | 0 718 | 0 | 21B | 0 | 0 | 18B | sub |
| write 10 address 5 | 8 | 21B | 18 | D 716 | add5 | add5 | 0 | 0 | 0 | D | write |
| write 9 address 6 | 9 | 22B | 19 | D | add6 | add6 | D | 0 | 0 | D | write |
| read 9 address 7 | 10 | 18B | 20 | D | 0 | add7 | D | 0 | 0 | D | read |
| add 5, 8, 9 | 11 | 0 | 21 | 0 | 0 | 0 | 0 | 0 | 0 | 22B | add |
| write 9 address 8 | 12 | 0 | 22 | D | add8 | add8 | 0 | 0 | 0 | D | write |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 9C

SLOT 15A AND SLOT 13

| INSTRUCTIONS | REG. MAP REG | REG. MAP SLOT |
|---|---|---|
| read 5 address 1 | 0 | 0 |
| read 6 address 2 | 1 | 0 |
| read 7 address 3 | 2 | 0 |
| read 8 address 4 | 3 | 0 |
| add 7, 8, 9 | 4 | 0 |
| mult 5, 9, 9 | 5 | 21A |
| add 5, 5, 5 | 6 | 11Ra |
| sub 5, 8, 10 | 7 | 14A |
| write 10 address 5 | 8 | 21B |
| write 9 address 6 | 9 | 22B |
| read 9 address 7 | 10 | 18B |
| add 5, 8, 9 | 11 | 0 |
| write 9 address 8 | 12 | 0 |
|  | 13 | 0 |
|  | 14 | 0 |
|  | 15 | 0 |

SLOTS

| SLOT | Aa | A | Af | Ba | B | Bf | Ra | FUNC |
|---|---|---|---|---|---|---|---|---|
| 10 | 0 | 0 | 0 | 0 | 0 | 0 | 0 | 0 |
| 11 | D | add2 | add2 | D | 0 | 0 | 0 | read |
| 12 | 0 | 0 | 0 | 0 | 0 | 0 | 0 | 0 |
| 13 | 0 | 0 | 0 | 0 | 0 | 0 | 0 | 0 |
| 14 | 0 | reg7 | reg7 | 17B | reg8 | reg8 | 15B | add |
| 15 | 0 | 0 | reg5 | D | 0 | 0 | 19B | mult |
| 16 | 16B | reg5 | reg5 | D | 0 | 0 | 17A | add |
| 17 | 21A | 0 | 0 | 21B | 0 | 0 | 18B | sub |
| 18 | D | add5 | add5 | 0 | 0 | 0 | D | write |
| 19 | D | add6 | add6 | D | 0 | 0 | D | write |
| 20 | D | 0 | add7 | D | 0 | 0 | D | read |
| 21 | 0 | 0 | 0 | 0 | 0 | 0 | 22B | add |
| 22 | D | add8 | add8 | 0 | 0 | 0 | D | write |
| 23 | 0 | 0 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |

FIG. 9D

SLOT 14

| INSTRUCTIONS | REG. MAP REG | REG. MAP SLOT |
|---|---|---|
| read 5 address 1 | 0 | 0 |
| read 6 address 2 | 1 | 0 |
| read 7 address 3 | 2 | 0 |
| read 8 address 4 | 3 | 0 |
| add 7, 8, 9 | 4 | 0 |
| mult 5, 9, 9 | 5 | 21A |
| add 5, 5, 5 | 6 | 11Ra |
| sub 5, 8, 10 | 7 | 14A |
| write 10 address 5 | 8 | 21B |
| write 9 address 6 | 9 | 22B |
| read 9 address 7 | 10 | 18B |
| add 5, 8, 9 | 11 | 0 |
| write 9 address 8 | 12 | 0 |
|  | 13 | 0 |
|  | 14 | 0 |
|  | 15 | 0 |

SLOTS

| SLOT | Aa | A | Af | Ba | B | Bf | Ra | FUNC |
|---|---|---|---|---|---|---|---|---|
| 10 | 0 | 0 | 0 | 0 | 0 | 0 | 0 | 0 |
| 11 | D | add2 | add2 | D | 0 | 0 | 0 | read |
| 12 | 0 | 0 | 0 | 0 | 0 | 0 | 0 | 0 |
| 13 | 0 | 0 | 0 | 0 | 0 | 0 | 0 | 0 |
| 14 | 0 | reg7 | 0 | 17B | reg8 | 0 | 0 | 0 |
| 15 | 0 | 0 | reg5 | D | reg9 | reg9 | 19B | mult |
| 16 | 16B | reg5 | reg5 | D | 0 | 0 | 17A | add |
| 17 | 21A | 0 | 0 | 21B | 0 | 0 | 18B | sub |
| 18 | D | add5 | add5 | 0 | 0 | 0 | D | write |
| 19 | D | add6 | add6 | D | 0 | 0 | D | write |
| 20 | D | 0 | add7 | D | 0 | 0 | D | read |
| 21 | 0 | 0 | 0 | 0 | 0 | 0 | 22B | add |
| 22 | D | add8 | add8 | 0 | 0 | 0 | D | write |
| 23 | 0 | 0 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |

14B, 15B, 16A, 11A

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | (0) | add2 D | 0 | 0 | 0 | 0 | read |
| read 7 address 3 | 2 | 0 | 12 | 0 | 0 | 0 | 0 755 0 | 0 | 0 | 0 | 0 |
| read 8 address 4 | 3 | 0 | 13 | 0 | 0 | 0 753 0 | 0 759 0 | 0 | 0 | 0 | 0 |
| add 7, 8, 9 | 4 | 0 | 14 | 0 757 reg7 | 0 | (0 | 0) | 0 | 0 | 0 | 0 |
| mult 5, 9, 9 | 5 | 21A | 15 | 0 | 0 | reg5 (0 | 0) | (reg9 | 19B | mult |
| add 5, 5, 5 | 6 | 11Ra | 16 | (0 | 0) | reg5 D | (reg5 | reg5) | 17A | add |
| sub 5, 8, 10 | 7 | 14A | 17 | 21A | 0 | 0 | 21B | (reg8 | reg8) | 18B | sub |
| write 10 address 5 | 8 | 21B | 18 | D | add5 | add5 | 0 | 0 | 0 | D | write |
| write 9 address 6 | 9 | 22B | 19 | D | add6 | add6 D | 0 761 | 0 | D | write |
| read 9 address 7 | 10 | 18B | 20 | D | 0 | add7 D | 0 | 0 | D | read |
| add 5, 8, 9 | 11 | 0 | 21 | 0 | 0 | 0 | 0 | 0 | 0 | 22B | add |
| write 9 address 8 | 12 | 0 | 22 | D | add8 | add8 | 0 | 0 | 0 | D | write |
|  | 13 | 0 | 23 | 0 | 0 | 0 | 0 | 0 | 0 | 0 | 0 |
|  | 14 | 0 | 24 | 0 | 0 | 0 | 0 | 0 | 0 | 0 | 0 |
|  | 15 | 0 | 25 | 0 | 0 | 0 | 0 | 0 | 0 | 0 | 0 |

*FIG. 9E*

SLOT 15

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | (0) | add2 | 0 | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 765 0 | 0 767 0 | 0 769 0 | 0 |
| add 7, 8, 9 | 4 | 0 | 14 | 0 | reg7 | 0 | 0 775 0 | 0 | 0 | 0 | 0 |
| mult 5, 9, 9 | 5 | 21A | 15 | 0 | 0 | (0) | 0 | 0 | (0) | (0) | (0) |
| add 5, 5, 5 | 6 | 11Ra | 16 | 0 | 0 763 reg5 | D | reg5) | reg5 | 17A | add |
| sub 5, 8, 10 | 7 | 14A | 17 | 21A | 0 | 0 | (21B | reg8) | reg8 | 18B | sub |
| write 10 address 5 | 8 | 21B | 18 | D | add5 | add5 | 0 | 0 | 0 | D | write |
| write 9 address 6 | 9 | 22B | 19 | D | add6 | add6 D | (reg9 | reg9) D | write |
| read 9 address 7 | 10 | 18B | 20 | D | 0 | add7 D 777 0 | 0 | D | read |
| add 5, 8, 9 | 11 | 0 | 21 | 0 | 0 | 0 | 0 771 | 0 | 22B | add |
| write 9 address 8 | 12 | 0 | 22 | D | add8 | add8 | 0 | 0 | 0 | D | write |
|  | 13 | 0 | 23 | 0 | 0 | 0 | 0 | 0 | 0 | 0 | 0 |
|  | 14 | 0 | 24 | 0 | 0 | 0 | 0 | 0 | 0 | 0 | 0 |
|  | 15 | 0 | 25 | 0 | 0 | 0 | 0 | 0 | 0 | 0 | 0 |

*FIG. 9F*

SLOT 16, 17B AND 16B

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 | D | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 | 0 781 | 0 783 | 0 785 | 0 | 0 787 | 0 789 | 0 |
| add 5, 5, 5 | 6 | 11Ra | 16 | 0 | 0 | (0) | (0) | (0) | (0) | (0) | (0) |
| sub 5, 8, 10 | 7 | 14A | 17 | 21A | (reg5 | reg5) | 0 | 0 | reg8 | 18B | sub |
| write 10 address 5 | 8 | 21B | 18 | D | add5 | add5 | 0 | 0 | 0 | D | write |
| write 9 address 6 | 9 | 22B | 19 | D 791 | add6 | add6 | D 793 | reg9 | reg9 | D | write |
| read 9 address 7 | 10 | 18B | 20 | D | 0 | add7 | D | 0 | 0 | D | read |
| add 5, 8, 9 | 11 | 0 | 21 | 0 | 0 | 0 | 0 | (reg8 | reg8) | 22B | add |
| write 9 address 8 | 12 | 0 | 22 | D | add8 | add8 | 0 | 0 | 0 | D | write |
| | 13 | 0 | 23 | 0 | 0 | 0 | 0 795 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 9G

SLOT 17A

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 | D | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 797 | 0 799 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 14A | 17 | (0) | (0) | reg5 | 0 | 0 | reg8 | 18B | sub |
| write 10 address 5 | 8 | 21B | 18 | D | add5 | add5 | 0 | 0 | 0 | D | write |
| write 9 address 6 | 9 | 22B | 19 | D | add6 | add6 | D | reg9 | reg9 | D | write |
| read 9 address 7 | 10 | 18B | 20 | D | 0 | add7 | D | 0 | 0 | D | read |
| add 5, 8, 9 | 11 | 0 | 21 | 0 | (reg5 | reg5) | 0 | reg8 | reg8 | 22B | add |
| write 9 address 8 | 12 | 0 | 22 | D 801 | add8 | add8 | 0 | 0 | 0 | D | write |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 9H

SLOT 17

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 | D | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 | 0 | 0 | 0 | 0 | 0 | 0 | 0 |
| add 5, 5, 5 | 6 | 11Ra | 16 | 0 | 0 803 0 | 0 811 | 0 805 | 0 807 | 0 809 | 0 | |
| sub 5, 8, 10 | 7 | 14A | 17 | 0 | 0 | (0) | 0 | 0 | (0) | (0) | (0) |
| write 10 address 5 | 8 | 21B | 18 | D | add5 | add5 | 0 | (reg10 | reg10) | D | write |
| write 9 address 6 | 9 | 22B | 19 | D | add6 | add6 | D | reg9 | reg9 | D | write |
| read 9 address 7 | 10 | 18B | 20 | D | 0 | add7 | D | 0 | 0 | D | read |
| add 5, 8, 9 | 11 | 0 | 21 | 0 | reg5 | reg5 | 0 | reg8 | reg8 | 22B | add |
| write 9 address 8 | 12 | 0 | 22 | D | add8 | add8 | 0 | 0 | 0 | D | write |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

| INSTRUCTIONS | REG. MAP REG | SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 | D | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 | 0 | 0 | 0 | 0 | 0 | 0 | 0 |
| add 5, 5, 5 | 6 | 11Ra | 16 | 0 813 | 0 815 | 0 | 0 | 0 | 0 | 0 | 0 |
| sub 5, 8, 10 | 7 | 14A | 17 | 0 | 0 | 0 | 0 | 0 | 0 | 0 | 0 |
| write 10 address 5 | 8 | 21B | 18 | (0) | (0) | add5 | 0 | reg10 | reg10 | D | write |
| write 9 address 6 | 9 | 22B | 19 | (0) | (0) | add6 | D | reg9 | reg9 | D | write |
| read 9 address 7 | 10 | 18B | 20 | D | 0 | add7 | D | 0 | 0 | D | read |
| add 5, 8, 9 | 11 | 0 | 21 | 0 | reg5 | reg5 | 0 | reg8 | reg8 | 22B | add |
| write 9 address 8 | 12 | 0 | 22 | (0) | (0) | add8 | 0 | 0 | 0 | D | write |
| | 13 | 0 | 23 | 0 813 | 0 815 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

SLOT 18

| INSTRUCTIONS | REG. MAP REG | REG. MAP SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 | D | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 | 0 | 0 | 0 | 0 | 0 | 0 | 0 |
| add 5, 5, 5 | 6 | 11Ra | 16 | 0 | 0 813 | 0 | 0 | 0 814 | 0 815 | 0 817 | 0 |
| sub 5, 8, 10 | 7 | 14A | 17 | 0 | 0 | 0 | 0 | 0 | 0 | 0 | 0 |
| write 10 address 5 | 8 | 21B | 18 | 0 | 0 | (0) | 0 | reg10 (0) | (0) | (0) | |
| write 9 address 6 | 9 | 22B | 19 | 0 | 0 | add6 | D | reg9 | reg9 | D | write |
| read 9 address 7 | 10 | 18B | 20 | D | 0 | add7 | D | 0 | 0 | D | read |
| add 5, 8, 9 | 11 | 0 | 21 | 0 | reg5 | reg5 | 0 | reg8 | reg8 | 22B | add |
| write 9 address 8 | 12 | 0 | 22 | 0 | 0 | add8 | 0 | 0 | 0 | D | write |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 9L

SLOT 19

| INSTRUCTIONS | REG. MAP REG | REG. MAP SLOT | SLOT | Aa | A | Af | Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 | D | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 | 0 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 14A | 17 | 0 | 0 819 | 0 821 | 0 823 | 0 | 0 825 | 0 827 | 0 829 |
| write 10 address 5 | 8 | 21B | 18 | 0 831 | 0 | 0 | 0 | reg10 | 0 | 0 | 0 |
| write 9 address 6 | 9 | 22B | 19 | 0 | 0 | (0) | (0) | (0) | (0) | (0) | (0) |
| read 9 address 7 | 10 | 18B | 20 | (0) | 0 | (0) | (0) | 0 | 0 | (0) | (0) |
| add 5, 8, 9 | 11 | 0 | 21 | 0 | reg5 | reg5 | 0 | reg8 | reg8 | 22B | add |
| write 9 address 8 | 12 | 0 | 22 | 0 | 0 833 | add8 | 0 835 | 0 | 0 837 | D 839 | write |
| | 13 | 0 | 23 | 0 | 0 | 0 | 0 | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

SLOT 21

| INSTRUCTIONS | REG. MAP REG | SLOT | SLOT | Aa | A | Af | SLOTS Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 D | 0 | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 | 0 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 14A | 17 | 0 | 0 | 0 | 0 | 0 | 0 | 0 | 0 |
| write 10 address 5 | 8 | 21B | 18 | 0 | 0 | 0 | 0 | reg10 | 0 | 0 | 0 |
| write 9 address 6 | 9 | 22B | 19 | 0 | 0 | 0 _841_ | 0 | 0 | 0 _843_ | 0 _845_ | 0 _847_ |
| read 9 address 7 | 10 | 18B | 20 | 0 | 0 | 0 | 0 | 0 | 0 | 0 | 0 |
| add 5, 8, 9 | 11 | 0 | 21 | 0 | reg5 (0) | 0 | 0 | reg8 (0) | (0) | (0) | |
| write 9 address 8 | 12 | 0 | 22 | 0 | 0 | add8 | 0 | (reg9 reg9) D | | | write |
| | 13 | 0 | 23 | 0 | 0 | 0 | 0 _849_ | 0 | 0 | 0 | 0 |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 9M

SLOT 22

| INSTRUCTIONS | REG. MAP REG | SLOT | SLOT | Aa | A | Af | SLOTS Ba | B | Bf | Ra | FUNC |
|---|---|---|---|---|---|---|---|---|---|---|---|
| read 5 address 1 | 0 | 0 | 10 | 0 | 0 | 0 | 0 | 0 | 0 | 0 | 0 |
| read 6 address 2 | 1 | 0 | 11 | 0 | 0 | add2 D | 0 | 0 | 0 | 0 | read |
| read 7 address 3 | 2 | 0 | 12 | 0 | 0 | 0 | 0 | 0 | 0 | 0 | 0 |
| read 8 address 4 | 3 | 0 | 13 | 0 | 0 | 0 | 0 | 0 | 0 | 0 | 0 |
| add 7, 8, 9 | 4 | 0 | 14 | 0 | reg7 | 0 | 0 | 0 | 0 | 0 | 0 |
| mult 5, 9, 9 | 5 | 21A | 15 | 0 | 0 | 0 | 0 | 0 | 0 | 0 | 0 |
| add 5, 5, 5 | 6 | 11Ra | 16 | 0 | 0 | 0 | 0 | 0 | 0 | 0 | 0 |
| sub 5, 8, 10 | 7 | 14A | 17 | 0 | 0 | 0 | 0 | 0 | 0 | 0 | 0 |
| write 10 address 5 | 8 | 21B | 18 | 0 | 0 | 0 | 0 | reg10 | 0 | 0 | 0 |
| write 9 address 6 | 9 | 22B | 19 | 0 | 0 | 0 | 0 | 0 | 0 | 0 | 0 |
| read 9 address 7 | 10 | 18B | 20 | 0 | 0 | 0 | 0 | 0 | 0 | 0 | 0 |
| add 5, 8, 9 | 11 | 0 | 21 | 0 | reg5 | 0 | 0 | reg8 | 0 | 0 | 0 |
| write 9 address 8 | 12 | 0 | 22 | 0 | 0 | (0) | 0 | reg9 (0) | (0) | (0) | |
| | 13 | 0 | 23 | 0 | 0 | 0 _851_ | 0 | 0 | 0 _853_ | 0 _855_ | 0 _857_ |
| | 14 | 0 | 24 | 0 | 0 | 0 | 0 | 0 | 0 | 0 | 0 |
| | 15 | 0 | 25 | 0 | 0 | 0 | 0 | 0 | 0 | 0 | 0 |

FIG. 9N

AUTONOMOUSLY CYCLING DATA PROCESSING ARCHITECTURE

BACKGROUND

1. Field of the Invention

The invention relates to the field of electronics. More particularly, the invention relates to an asynchronous computer architecture that does not rely on a central clock for timing and control of data processing operations.

2. Related Art

Several proposals are known for making asynchronous circuits that potentially relate to executing program instructions, as reflected in the documents listed below.
1. S. B. Furber, P. Day, J. D. Garside, N. C. Paver and J. V. Woods, *AMULET*1: A Micropipelined ARM, Department of Computer Science, The University, Oxford Road, Manchester, M13 9PL, UK, Undated.
2. Mark Edward Dean, *STRIP: A Self-Timed Risc Processor*, Technical Report No. CSL-TR-92-543, Stanford University Computer Systems Laboratory, July 1992.
3. Jens Sparso and Jorgen Staunstrup, *Delay-Insensitive Multi-Ring Structures*, Integration, the VLSI Journal 15, 1993.
4. J. D. Garside, *A CMOS VLSI Implementation of an Asynchronous ALU*, Department of Computer Science, Manchester University, Oxford Road, Manchester, M13 9PL, UK, Undated.
5. S. B. Furber, P. Day, J. D. Garside, N. C. Paver, S. Temple and J. V. Woods, *The Design and Evaluation of an Asynchronous Microprocessor*, Department of Computer Science, The University, Oxford Road, Manchester M13 9PL, England, Undated.
6. Jens Sparso, Jorgen Staunstrup, Michael Dantzer-Sorensen, *Design of Delay Insensitive Circuits Using Multi-Ring Structures*, European Design Automation Conference, EURO-VHDL '92, 1992 IEEE 0-8186-2780, pp. 15–20, August 1992.
7. David E. Mueller, *Asynchronous Logics and Application to Information Processing*, Switching Theory in Space Technology, Stanford University Press, pp. 289–297, 1963.
8. J. Staunstrup and M. R. Greenstreet, *Designing Delay Insensitive Circuits using "Synchronized Transitions"*, Elsevier Science Publishers B. V. (North-Holland), IFIP, 1990.
9. Teresa H. Y. Meng, Robert W. Brodersen, David G. Messerschmitt, *Automatic Synthesis of Asynchronous Circuits from High-Level Specifications*, IEEE Transactions on Computer-Aided Design, Vol. 8, No. 11, pp. 1185–1205, November 1989.
10. Ivan E. Sutherland, *MICROPIPELINES*, Communications Of The Acm, Vol. 32, No. 6, PP. 720–738, June 1989.

Despite these proposals, the dominant processors commercially available today are based on boolean clocked logic, and have centrally controlled architectures optimized for characteristics of boolean clocked logic.

SUMMARY

An architecture is disclosed having a characteristic of permitting programmed instructions to be performed in a distributed, asynchronous, and cascaded manner. The system includes program memory, an instruction decoder, and a slot structure. The system may also include a remap register, general function elements, and general purpose memory.

The slot structure provides a set of slots. Each slot is a semi-autonomous location for collecting information necessary to complete an operation derived from a program instruction. A slot is semi-autonomous in the sense that, when complete information has been collected, the slot initiates action to resolve the operation. After resolving a first operation, the slot is free to resolve a new operation.

In a preferred embodiment, slots contain first and second data register complexes, a result address register complex, and a function register complex. Each complex may include multiple registers useful for receiving information as alternating wavefronts of NULL and meaningful data. Complexes preferably include address registers that can be loaded to indicate other locations within the system to which data can be forwarded.

A slot preferably monitors the completeness of information within its register complexes and initiates resolution of operations immediately upon collection of a complete set of information. When complete information is present in operand register(s), a result address register, and a function register, the slot forwards a complete function call to general function elements, or otherwise resolves the function. The general function elements return results to the address indicated in the result address register.

Individual register complexes may individually monitor completeness of information within the registers of the complex, and initiate actions relating to that complex. For example, a register complex may contain a data register and an address register. When meaningful data and address information is present, the register complex initiates an operation to forward the data to the indicated address, such as to another slot.

The slot structure expressly accommodates dependency relationships among instructions. A dependency relationship is a relationship in which information needed to resolve an operation is derived from another operation. For example, if a first slot is assigned to perform a first operation, and if a second slot is assigned to perform a second operation, and if the second operation requires the result of the first operation, then the second operation is said to have a dependency relationship with the first operation.

The slot structure accommodates dependency relationships among program instructions by providing mechanisms for storing information about the relationships. In the preferred embodiment, information about a dependency relationship takes the form of result address information and data address information stored in slots. The address information stored in a first slot points to another slot, and this pointer from one slot to another reflects the dependency relationship between the operations assigned to those slots. A slot can forward information to another slot in accordance with a dependency relationship based on locally available completeness of information, without awaiting an initiation signal from a centralized control circuit.

The accommodation of dependency relationships among slots enhances concurrent processing, and thus enhances overall processing speed. Many instructions can be decoded and assigned to slots, even though full information required by later instructions might not be available at those later instructions are decoded and assigned. Dependency information is stored locally in the slots, so that slots can take action to forward data to other slots as it becomes available. Slots locally monitor completeness of information, and can resolve their respective instructions without further delay when information is complete. Slots are semi-autonomous and asynchronous, and they resolve operations in parallel to the full extent permitted by the program instruction.

Preferably, all operations take place without reference to a central clock. Information is communicated to the slots as alternating wavefronts of meaningful data and NULL values. However, it will be appreciated after understanding the description herein that many advantages of the slot structure will be retained when using clocked logic circuits.

An object of the present invention is to provide an improved method and apparatus for executing programmed instructions.

A further object of the invention is to provide a method and apparatus for executing programmed instructions that fully exploits concurrency inherent in the program.

A further object of the invention is to provide a method and apparatus for executing programmed instructions that permits asynchronous and/or semi-autonomous data processing operations.

A further object of the invention is to provide an architecture for executing programmed instructions that provides multiple locations for resolving data processing operations.

A further object of the invention is to provide an architecture for executing programmed instructions that explicitly realizes dependency relationships among operations.

A further object of the invention is to provide a slot structure for resolving multiple data processing operations.

A further object of the invention is to provide a decoder for realizing dependency relationships among instructions.

These and other objects are achieved by providing the method and apparatus described herein.

BRIEF DESCRIPTION OF THE DRAWINGS

The invention will be described below with reference to attached drawings in which:

FIGS. 8A–8M illustrate sequences of events for a series of instructions to be executed in the architecture of FIG. 4;

FIGS. 9A–9N show the state of the system as those slots complete execution of (i.e., resolve) the instructions of FIGS. 8A–8M;

DETAILED DESCRIPTION OF THE PREFERRED EMBODIMENTS

Figure 1A:
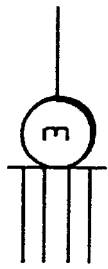
FIGS. 1a and 1b illustrates two graphic symbols for a three of four gate.

The organization, operation, advantages and objects of the invention can be more fully appreciated from the following description and associated drawings. When an element is referenced in multiple drawings, the element is identified with the same reference numeral in each drawing where it appears. Wherever the written description refers to another document (such as another patent application or patent) with the notation, "incorporated herein by reference," it is intended that the entire content of that document should be considered by the reader as if it were reproduced in its entirety as part of the description. Wherever a document is incorporated by reference and that document in turn incorporates a third document by reference, it is intended that the entire content of that third document should be considered by the reader as if it were reproduced in its entirety as part of the description.

Conventions (50–99)

The embodiments described below preferably are asynchronous electronic systems, in the sense that they do not require a system clock to synchronize logic operation. They are based on non-boolean logic primitives and utilize data representations that are not limited to having first and second data states. (Of course, asynchronous logic may be configured to perform boolean logic, as well as other more complex functions.) Certain conventions will be used herein to describe the preferred embodiments. Some of those conventions are discussed preliminarily in order to assist in understanding the descriptions that follow.

The embodiments described below preferably use one of the data representations discussed in U.S. Pat. No. 5,305,463, "Null Convention Logic System," which is incorporated herein by reference. In one such representation, a variable has a number of possible values. Each value is assigned to a single physical signal line. Each signal line may assume a meaningful data state or another state which has no data meaning (i.e., the NULL state). Only one signal line may be in the meaningful state at a time. The value of the variable is determined by noting which of the signal lines is in the meaningful state. If all signal lines are in the NULL state, the variable has no data value. For example, in a so-called "dual rail" representation a single binary digit is represented using two physical signal lines. The first signal line is assigned the numeric value zero (0), and a second signal line is assigned the numeric value "1". Each signal line may assume one of two voltage states, e.g., zero (0) volts or five (5) volts. When the first signal line assumes the five-volt state and the second signal line assumes the zero-volt state, the variable takes on the numeric value "0". When the second signal line assumes the five-volt state and the first signal line assumes the zero-volt state, the variable takes on the numeric value "1". When both signal lines are in the zero-volt state, the variable has no data meaning. During normal operation, it is not permitted for both signal lines to be in the five-volt state. A variety of other data representations can be used, e.g., inverted logic. For the purpose of illustration, dual rail representation of binary signals will be assumed in the remainder of this description, with signal lines able to assume first and second voltage states.

Hereafter, a signal line will be said to be "asserted" or "meaningful" if it is a meaningful data state. A signal line will be said to be NULL if it is in the NULL state. A variable will be said to be asserted or meaningful if one of its associated signal lines is in a meaningful data state. A variable will be said to be NULL if all of its associated signal lines are in a NULL state.

The embodiments described below preferably use threshold logic implemented with gates described in U.S. patent application Ser. No. 08/711,232, "Null Convention Threshold Gate," filed Sep. 9, 1996 now U.S. Pat. No. 5,656,948, which is incorporated herein by reference. In one such family of gates, each gate has a single output and a number of inputs. A gate receives inputs that can be asserted or NULL, and the gate drives an output physical line to its asserted or NULL state according to switching rules.

Figure 1B:
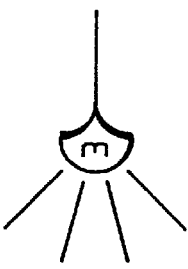

Preferably, the threshold gates have a hysteresis characteristic in the switching rules. A gate output switches from NULL to asserted when the number of asserted inputs exceeds a threshold value. The gate output holds the asserted output until all inputs return to NULL. Thus, a gate can be characterized by the number of input signal lines and the value of the threshold. A gate having four inputs and a threshold of three will be said to be a "three-of-four" gate. FIGS. 1a and 1b illustrates two graphic symbols for a three of four gate. The symbol of FIG. 1a corresponds to symbols used in U.S. patent application Ser. No. 08/711,232, and is included here to assist in relating the content of that application to descriptions of the present embodiments. FIG. 1b is a different symbol for the same gate, and represents the convention that will be used for the remainder of this description. The symbol is a circle with an attached bar. Inputs connect to the bar. The output extends from the circle. A numeral within the circle indicates the value of the threshold.

The embodiments described below preferably use asynchronous data registers as described in U.S. patent application Ser. No. 08/318,508 "Asynchronous Register for Null Convention Logic Systems," now U.S. Pat. No. 5,652,902 which is incorporated herein by reference. An Asynchronous register is a device that receives a set of inputs, stores their values, and passes those values on to a corresponding set of outputs. As used in the embodiments described below, asynchronous registers regulate timing of alternating wavefronts of NULL and meaningful data so that a set of signal lines cycle through the NULL state before assuming new meaningful values.

Figure 2A:
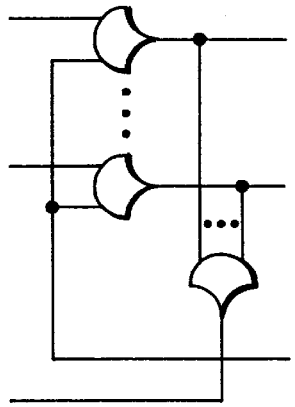
FIGS. 2a and 2b illustrates two graphic symbols for an asynchronous register.
Figure 2B:
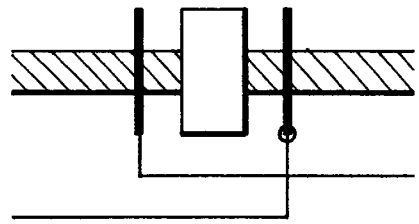

FIGS. 2a and 2b illustrates two graphic symbols for an asynchronous register. The symbols of FIG. 2a corresponds to symbols used in U.S. patent application Ser. No. 08/318,508, now U.S. Pat. No. 5,652,902 and is included here to assist in relating the content of that application to descriptions here of the present embodiments. FIG. 2b is a different symbol for an asynchronous register, and represents the convention that will be used for the remainder of this description. The symbol is a rectangle with (1) a preceding lightweight line and (2) a following heavy weight line attached to a dot. The rectangle represents memory storage elements. The lightweight preceding line represents an enable input which, when asserted, permits data to pass to the memory storage elements. The heavyweight following line represents a "watcher" gate that monitors the output signal lines and generates an output signal called "DACK/NACK" (meaning data acknowledge/NULL acknowledge). As discussed more fully in U.S. patent application Ser. No. 08/318,508, now U.S. Pat. No. 5,652,902 the DACK/NACK signal line is NULL when all output signal lines are NULL, and is asserted when all variables of the output are asserted. When asserted, the DACK/NACK signal can be used to indicate to a preceding circuit that the register is ready to receive a new NULL wavefront. When NULL, the DACK/NACK signal can be used to indicate to a preceding circuit that the register is ready to receive a new wavefront of meaningful data (i.e., a data wavefront). A preceding asynchronous register receives the DACK/NACK signal on its enable input from a following asynchronous register. It should be noted that no system clock is required to trigger the loading of data into a register. Instead, a register will load data as soon as (1) a downstream circuit is prepared to accept it, and (2) an upstream circuit has meaningful data available.

Autonomously Cycling System Loop

The data processing architecture that is discussed more fully below has particular advantages for use in asynchronous systems that operate without a system clock. The operation and advantages of the architecture can be seen and appreciated more fully after first understanding the operation of a simple, asynchronous autonomously cycling system loop.

Figure 3A:
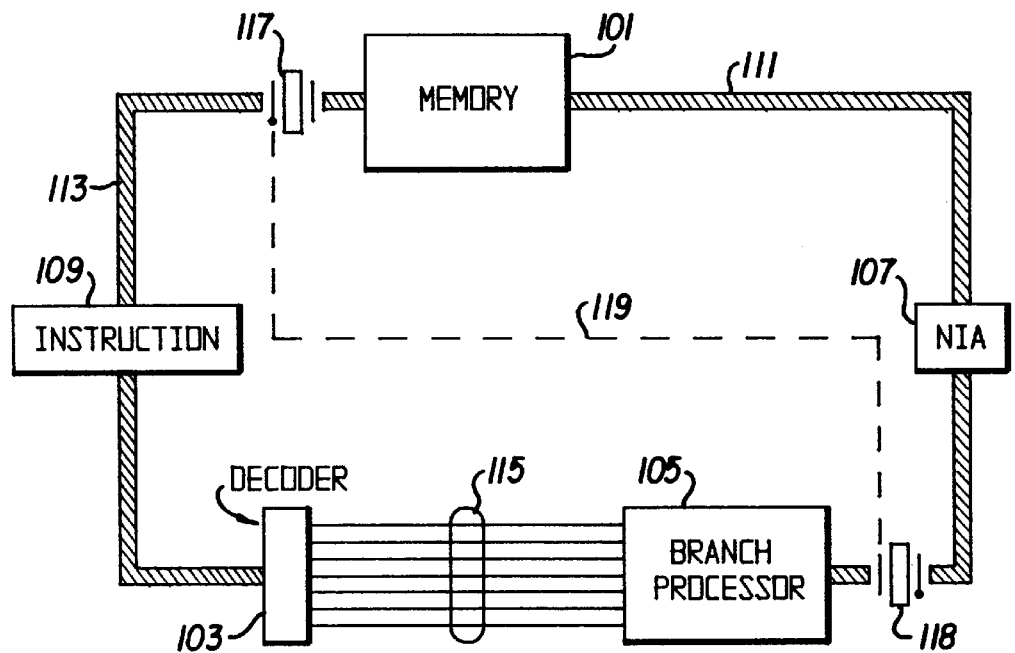
FIG. 3a illustrates elements of an autonomously cycling system loop.

FIG. 3a illustrates elements of an autonomously cycling system loop. The loop includes a memory element 101, a field decoder 103, and a branch processor 105. The branch processor 105 issues a next instruction address 107 ("NIA"), which can be viewed as a wavefront of meaningful signals following a wavefront of NULL passing through asynchronous register 118 to instruction address bus 111. The memory 101 generates an instruction 109, which can be viewed as a wavefront of meaningful signals following a wavefront of NULL passing through asynchronous register 117 to instruction bus 113. The decoder 103 transforms the instruction wavefront into a series of field signals, which can be viewed as wavefronts of meaningful signals followed by wavefronts of NULL signals passing through asynchronous registers (not shown) to field signal lines 115.

The branch processor 105 performs operations defined by the field wavefronts, including the generation of a new NIA 107. When memory holds a set of program instructions, the branch processor can perform such functions as maintaining a current program address, maintaining an address stack, and giving effect to program flow control instructions, such as branching on condition, return from function calls, etc.

Autonomous cycling permits the loop to read and decode instructions in a distributed manner without intervention of a central controller or system clock. Each element signals a preceding element to send new meaningful data after it has processed a NULL wavefront, or to send a NULL wavefront after it has processed meaningful data. For example, when memory 101 generates a meaningful output, it signals branch processor 105 that it is ready to receive a NULL wavefront. When branch processor 105 sends a NULL wavefront, it signals decoder 103 that it is ready to receive a wavefront of meaningful data. When decoder 103 sends meaningful data, it signals memory 101 that it is ready to receive a NULL wavefront. Memory, which previously generated a meaningful wavefront, sends a NULL wavefront and signals the branch processor that it is ready to receive a meaningful address. Branch processor, which previously sent a NULL wavefront, sends a new meaningful address, and signals decoder 103 that it is ready to receive a NULL wavefront. The decoder 103, which previously sent meaningful data, sends a NULL wavefront and signals memory 101 that it is ready to receive a new meaningful instruction. Memory then generates a new meaningful instruction, and the process repeats itself. Wavefronts of meaningful signals (such as addresses and instructions) propagate around the loop separated by wavefronts of NULL.

FIG. 3a illustrates portions of a mechanism for autonomous cycling using asynchronous registers 118 and 117. Asynchronous register 117 located at the output of the memory 101 communicates through line 119 to an asynchronous register 118 located at the output of the branch processor 105. Asynchronous register 117 signals asynchronous register 118 that register 117 has placed a meaningful instruction on bus 113. This signifies that memory 101 is now ready to receive NULL. Register 118 permits a NULL wavefront to propagate to memory 101 when two conditions are met: (1) register 117 signals that memory 101 is ready to receive NULL, and (2) branch processor presents NULL to register 118 (which signifies that branch processor 105 has completed processing a NULL wavefront. Similar signaling takes place between an asynchronous register (not shown) at the output of the decoder 103 and register 117, and between the asynchronous register (not shown) and register 118.

Each element makes a local decision to propagate meaningful data or NULL, based upon its own completion of a prior cycle, and the readiness of a subsequent element to receive the next wavefront. If an element is delayed in completing a cycle, then the prior and/or subsequent elements will pause until the element is ready. If an element fails completely, the entire loop will halt.

In a clocked, binary, boolean system, by contrast, a central clock will trigger each element to take action at regular intervals. If an element fails, it will still output voltage signals that appear as data to a subsequent element. At the next cycle, the subsequent element will clock in the faulty signals and act upon them. In such a situation, the external clock will force circuits to latch faulty until some external circuit intervenes. (For example, a branch processor may produce a nonsense address, which will propagate into a decoder and produce commands that cause a breakdown of system operation.)

FIG. 3a illustrated two asynchronous registers as separate elements. It should be appreciated that the asynchronous registers can be integrated into functional blocks, and that they need not be stand-alone elements in drawings or circuits.

Figure 3B:
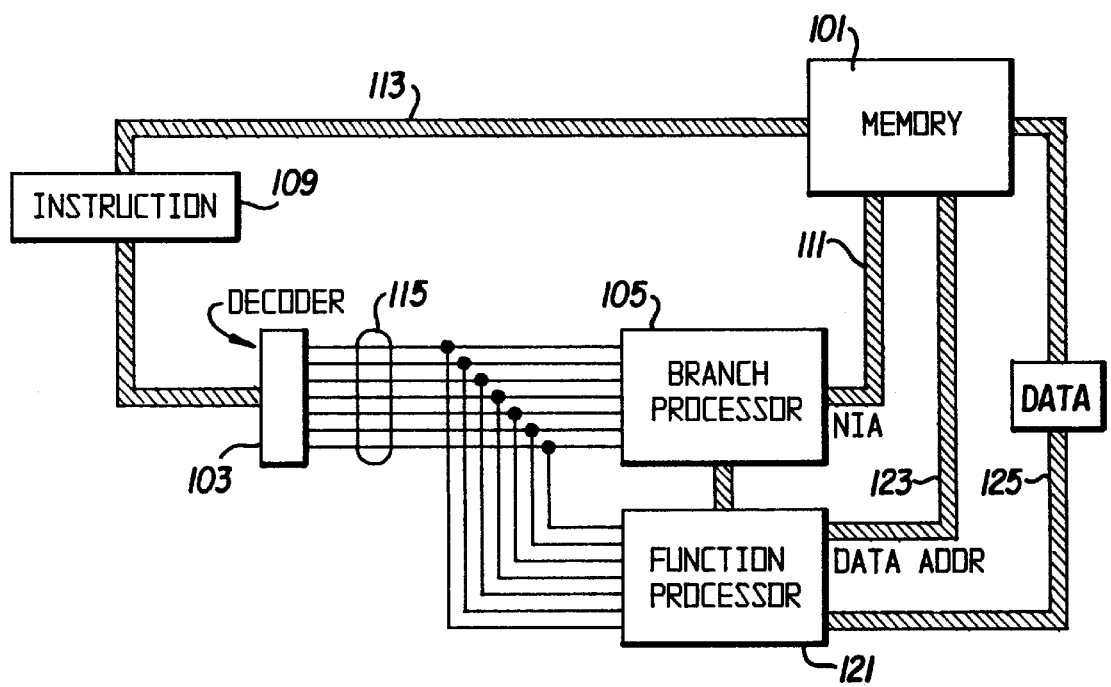
FIG. 3b illustrates elements of an autonomously cycling system loop with function processor.

FIG. 3b illustrates elements of an autonomously cycling system loop with function processor. It includes the elements of the loop shown in FIG. 3a, such as memory 101, decoder 103, and branch processor, instruction address bus 111, instruction bus 113, and field lines 115. The loop of FIG. 3b further includes function processor 121, which receives field lines 115 and has access to memory 101 through data address bus 123 and data bus 125. The function processor 121 can perform data processing functions that are not directly related to program flow control, such as arithmetic and logic functions, input/output, etc.

A Cascade Architecture (200–299)

Figure 4:
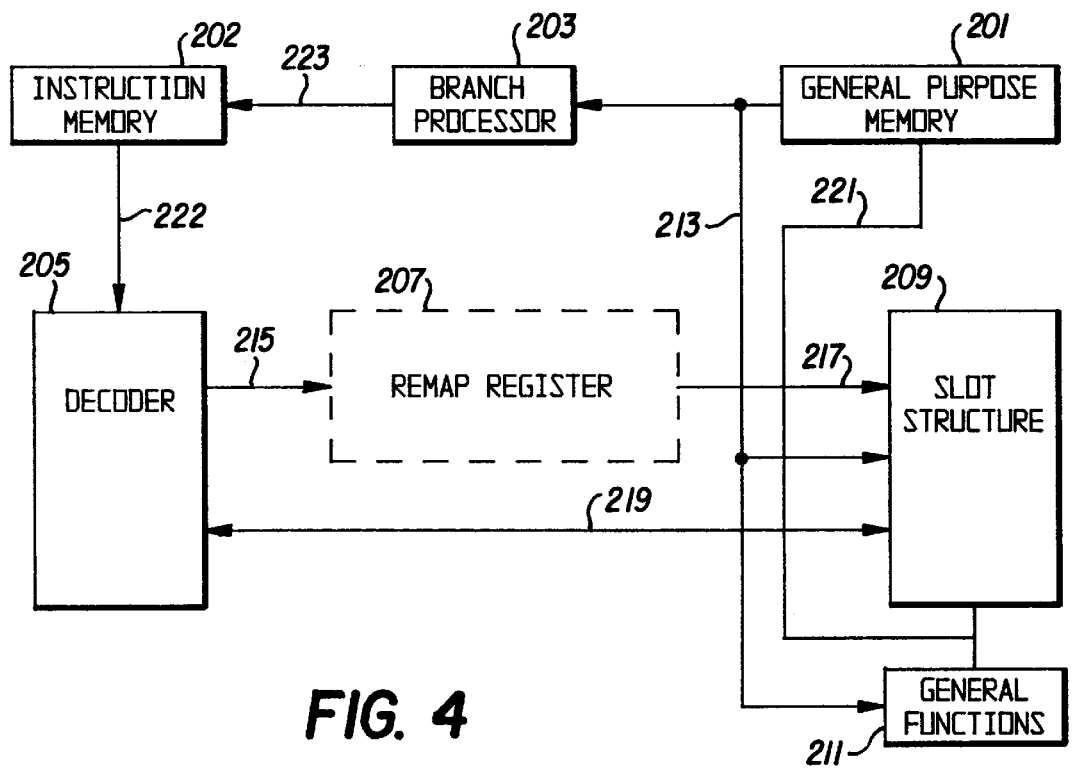
FIG. 4 illustrates elements of a autonomously cycling data processing architecture having a cascading slot structure.

FIG. 4 illustrates elements of an autonomously cycling data processing architecture having a cascading slot structure. The architecture includes general purpose memory 201, instruction memory 202, an instruction decoder 205, and a slot structure 209. The architecture may optionally include a branch processor 203, a remap register 207, and general function elements 211. A state bus 213 provides a common data path among the general purpose memory 210, branch processor 203 (if present), instruction memory (if no branch processor 203) slot structure 209 and general function elements 211. (If a branch processor 203 is present, the output of the branch processor 223 connects to the instruction memory 202 through data path 223. If a remap register is present, a first set of local signal paths 215 connect the decoder 205 to the remap register 207, and a second set of local signal paths 217 connect the remap register 207 to the slot structure 209. Otherwise, the decoder 205 connects directly to the slot structure 209. A third set of local signal paths 219 connect the decoder directly to the slot structure.

A function bus 221 connects the slot structure 209 to the general function element 211. The state bus 213 may be a bus as disclosed in copending U.S. patent application Ser. No. 08/424,865, now U.S. Pat. No. 5,796,962 "Null Convention Bus," which is incorporated herein by reference.

The architecture of FIG. 4 autonomously cycles in a manner similar to the autonomously cycling loop of FIG. 3. Asynchronous registers are not shown, but should be understood to be integrated into functional elements and function to regulate alternating wavefronts of NULL and meaningful data on all signal lines. The general cycle involves the steps of: (1) reading an instruction from instruction memory 202, converting instructions into fields for further processing in the decoder 205; (3) mapping the fields to a slot in the slot structure 209 (using the remap register 207 if present); (4) performing the function called for by the decoded instruction in a slot of the slot structure 209 (this step may involve use of the general function element), and (5) calling a new instruction from instruction memory 202. Depending on the type of instruction, data may be read from, or written to general purpose memory 201 through state bus 213.

In this architecture, many elements share the common state bus 213, which can be used: (1) as part of a cycling loop as shown as FIGS. 3a or 3b, and (2) for reading and writing to general purpose memory, and (3) other purposes as desired.

The slot structure of the architecture of FIG. 4 includes multiple circuits that permits concurrent resolution of multiple instructions. (The term "resolution" will be more fully appreciated after a more detailed description of the slot structure, however, for the purpose of this paragraph, resolution can be thought of as a form of instruction execution.) Detailed description of the operation of the architecture will be best understood after a more detailed description of the slot structure 209 and decoder 205.

Slot Structure (300–349)

Figure 5:
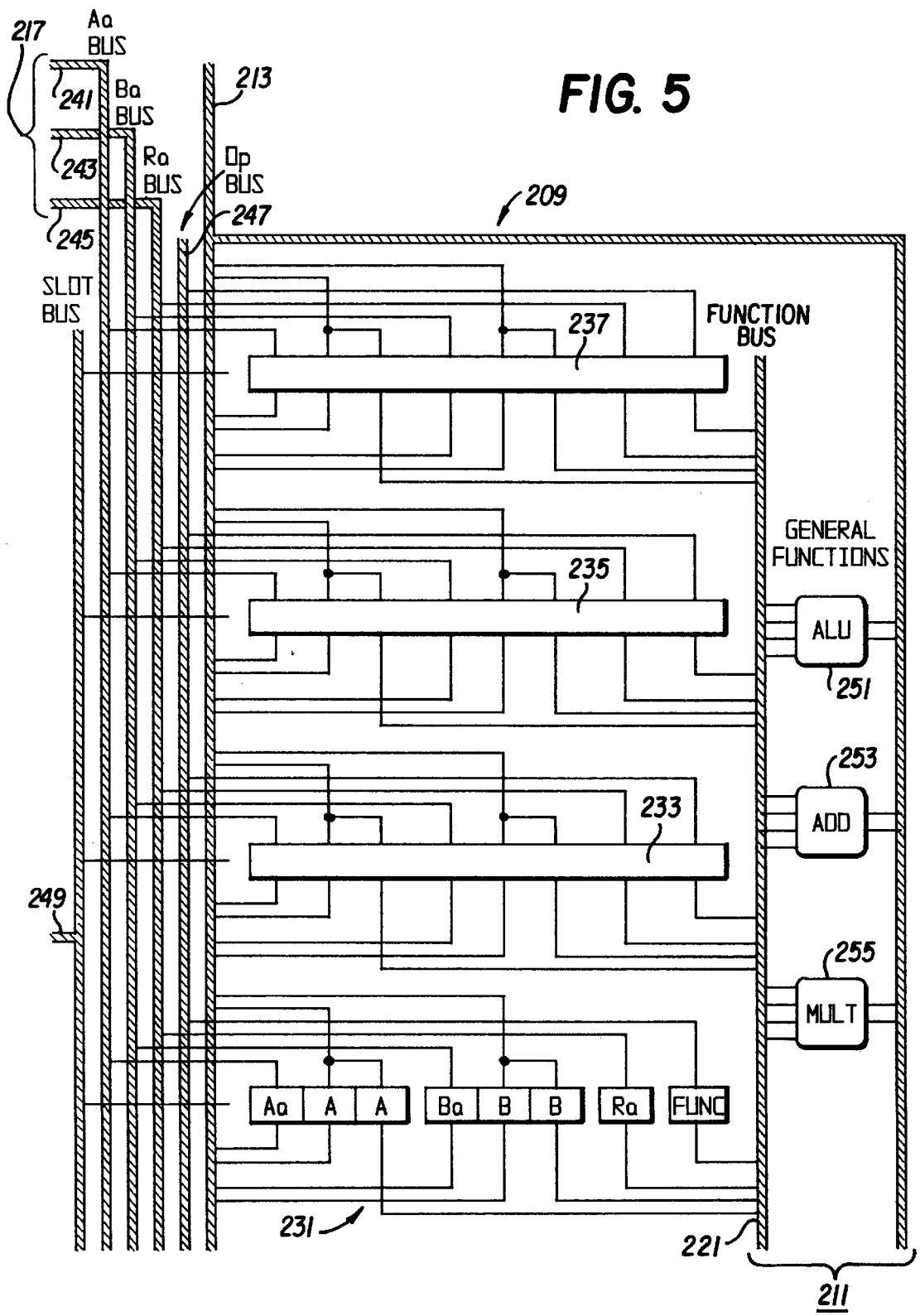
FIG. 5 illustrates elements of the slot structure in the architecture of FIG. 4.

FIG. 5 illustrates elements of the slot structure in the architecture of FIG. 4. The structure includes multiple slots 231, 233, 235, 237 connected to state bus 213.

The remap register 207 connects to slots 231, 233, 235, 237, through three buses: Aa bus 241, Ba bus 243, and Ra bus 245 (which were collectively shown in FIG. 4 as item 217). The decoder 205 connects to slots 231, 233, 235, 237 through OP bus 247 and slot bus 249, (which were collectively shown in FIG. 4 as item 219). The OP bus 247 may include several sub parts, including OE, RC, IM and OP portions as discussed more fully below.

FIG. 5 shows four slots for ease of explanation, however, it is contemplated that more slots will be provided with substantially the same structure, function, and connectivity as the ones shown. FIG. 5 also shows a set of general function elements 211, including an arithmetic logic unit 251, adder 253, multiplier 255, and others, e.g., divider, (not shown). These elements may be well known clocked circuits connected through interface circuits of the kind described in U.S. patent application Ser. No. 08/423,770, "Null Convention Interface Circuit," now abandoned which is incorporated herein by reference. The adder may be derived from a full adder as described in copending U.S. patent application Ser. No. 08/483,557, "Null Convention Adder," now U.S. Pat. No. 5,793,662 which is incorporated herein by reference. The general function elements connect to the slots through function bus 221, and they also connect to the state bus 213.

Figure 6:
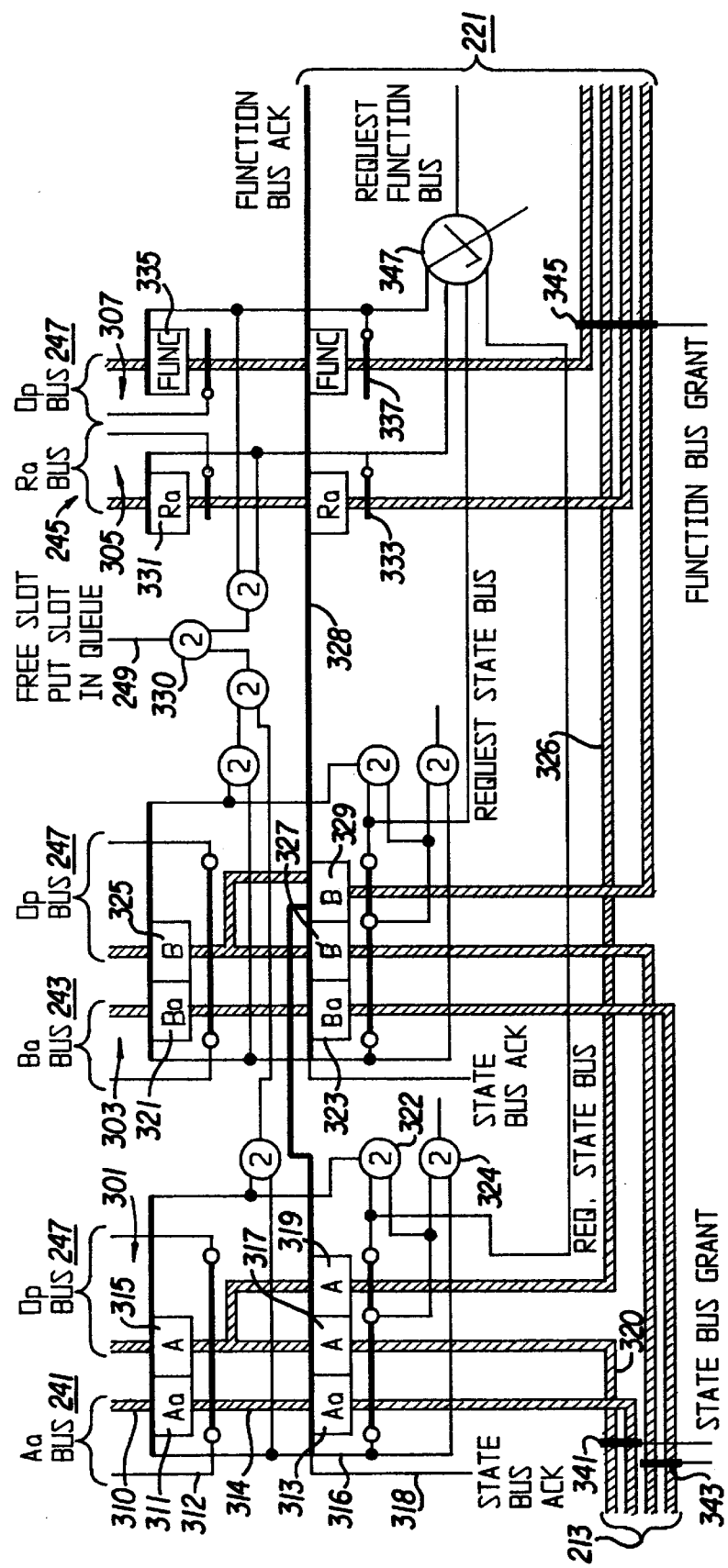
FIG. 6 illustrates detailed elements of a slot of the slot structure of FIG. 5.

FIG. 6 illustrates detailed elements of an individual slot 231 of the slot structure 209 of FIG. 5. The slot 231 includes:

an A register complex 301; a B register complex 303; an R register complex 305; and a function register complex 307. Each register complex includes asynchronous registers that generate and receive DACK/NACK signals, and a number of additional individual gates that generate or receive bus request and grant signals as discussed in more detail below.

The A register complex includes: first and second A address registers 311, 313; first and second A data registers 315, 317; and function A data register 319. The first and second A address registers form a two-register pipeline that propagate alternating wavefronts of NULL and meaningful address data. The first A address register 311 receives alternating wavefronts of NULL and meaningful addresses on parallel signal lines 310, and returns a DACK/NACK signal on individual signal line 312. The second A address register 313 receives alternating wavefronts of NULL and meaningful addresses from the first A address register 311 on parallel signal lines 314. The second A address register 313 also: presents wavefronts to state bus signal lines 320; receives a DACK/NACK signal on individual signal line 318 from the state bus; and returns a DACK/NACK signal on individual signal line 316 to the first A address register 311. A set of two-of-two gates 341 isolates the output of the second A address register 313 from the Aa bus 241 and OP bus 247. A set of two-of-two gates 345 isolates the output of the function A data register 319 from the function bus 221.

An example will illustrate the passage of NULL and meaningful address wavefronts through the first and second A address registers. Typically, the first A address register 311 holds NULL when the second A address register 313 holds data, and vice versa. Assume, as a starting condition, that: (1) the first A address register 311 holds NULL, presents NULL on signal lines 314, and returns NAK (NULL acknowledge) on signal line 312; (2) the second A address register 313 holds a meaning address, presents a meaningful address on signal lines 320, and returns DAK (Data acknowledge) on signal line 316; (3) an upstream element (e.g., branch processor 203 of FIG. 4) has presented a new meaningful address to the first A address register 311 on signal lines 310; and (4) a downstream element (e.g., memory element 201 of FIG. 4) has not yet acknowledged receipt of the meaningful address by generating a DAK signal on line 318. In this condition, the two-register pipeline formed by the first and second A address registers 311, 313 is waiting for the downstream element (e.g., memory element 201) to complete processing, so that the pipeline can begin the next cycle.

The first part of the new cycle begins when downstream element (e.g., memory element 201) generates a DAK signal through signal line 318. This DAK signal enables the second A address register 313 to propagate the NULL wavefront waiting on signal lines 314. After the second A address register 313 has stored NULL, it presents NULL on state bus address lines 320, and generates a NAK signal on signal line 316. This NAK signal enables the first A address register 311 to propagate the new meaningful address wavefront waiting on signal lines 310. (If, for some reason a new meaningful wavefront is not present on signal lines 310, the first A address register will simply wait until the new meaningful wavefront arrives.) After the first A address register 311 has stored the meaningful address, it presents the meaningful address on signal lines 314, and generates a DAK signal on signal line 312. This DAK signal indicates to an upstream element (e.g., branch processor 203 of FIG. 4) that the first A address register 311 is ready to receive NULL.

The second part of the new cycle begins when downstream element (e.g., memory element 201 of FIG. 4) generates a NAK signal through signal line 318. This NAK signal enables the second A address register 313 to propagate the new meaningful address wavefront waiting on signal lines 314. After the second A address register 313 has stored the new meaningful wavefront, it presents the meaningful address on state bus address lines 320, and generates a DAK signal on signal line 316. This DAK signal enables the first A address register 311 to propagate the new NULL wavefront waiting on signal lines 310. After the first A address register 311 has stored the NULL wavefront, it presents NULL on signal lines 314, and generates a NAK signal on signal line 312. This NAK signal indicates to an upstream element (e.g., branch processor 203 of FIG. 4) that the first A address register 311 is ready to receive NULL. The pipeline has now returned to its starting condition, and is ready to start a new cycle.

At the end of the second part of the cycle, the second A address register 313 is holding a meaningful address, and a NULL wavefront is waiting on signal lines 314. The second A address register will not pass the NULL wavefront until the downstream element (e.g., memory element 201 of FIG. 4) indicates that it has received the old meaningful address and is ready to receive a NULL wavefront. If a memory element is slow relative to other system elements, the second A address register 313 will simply wait. In turn, the first A address register 311 will wait for the second A address register 313. This situation illustrates two important characteristics of the system. First, completion of a process (e.g., advancing to a new stage of the cycle) depends only on the presence at a processing location (e.g., the second A address register) of all the information needed to complete the process. If some required information has not propagated to the location where it is needed, that location will simply wait until the information arrives. At the instant that the last quantum of required information arrives, the location immediately completes the process. A slow element will not cause the system to fail—only to operate at the speed of the slow element. If a faster or slower element is substituted, the circuit speed will change accordingly, but will continue to operate. As a result, all operations operate as fast as the devices will allow. There is no need to perform worst-case propagation delay analysis on all circuits, or to design wasteful timing margin into the system.

These characteristics of localized completion and delay insensitivity contrast with centrally-controlled and clocked systems, where a periodic external system would force the location to complete the process after a fixed time period. If necessary information has not yet arrived at a location, the location will utilize old or invalid information, and erroneously perform the process at the next clock cycle. If a faster or slower element is substituted, the system clock timing must be reevaluate, and the operating speed of the entire system may have to be altered.

As discussed above, the first and second A address registers 311, 313 form a two-register pipeline that propagate alternating wavefronts of NULL and meaningful addresses. The A register complex 301 contains a second, two-register pipeline made up of first and second A data registers 315, 317, which operate in a manner analogous to the A address registers 311, 313. Both the second A address register and the second A data register receive the same DACK/NACK signal on line 318 from the state bus. A set of two-of-two gates 341 also isolates the output of the second A data register 317 from the Aa bus 241.

The A register complex also contains a function A data register 319 which receives data in parallel with the second A data register 317. A two-of-two threshold gate 322 combines the two DACK/NACK signal lines output from the second A data register 317 and from the function A data register 319 into a single DACK/NACK signal line to the first A data register. Both the function A data register 319 and the second A data register 317 must have completely propagated a NULL wavefront before the first A data register 315 will propagate a meaningful data wavefront. Similarly, both the function A data register 319 and the second A data register 317 must have completely propagated a meaningful data wavefront before the first A data register 315 will propagate a NULL wavefront. A two-of-two threshold gate 324 combines DACK/NACK outputs from the second A address register 313 and from the second A data register 319 into a single request by the A register complex for access to the state bus 213.

Connections to the function A data register differ from the connections to the second A data register in a number of ways. First, the data output from the function A register goes to the function bus 221 on parallel 326. Second, the DACK/NACK input to the function A data register is received from the function bus on individual signal line 328.

The B register complex includes: first and second B address registers 321, 323; first and second B data registers 325, 327; and function B data register 329. The B registers are configured substantially identically to the A registers, except that the B registers received address and data from the Bb bus 243. A set of two-of-two gates 343 isolates the output of the second B address register 323 from the Ba bus 243, and also isolate the second B data register 327 from the OP bus 247. A set of two-of-two gates 345 isolate the output of the function B data register 329 from the function bus 221.

The Ra register complex includes first and second R address registers 331, 333 configured as a single, two-register pipeline. The first Ra address register 331 propagates alternating wavefronts of NULL and meaningful addresses from the Ra bus 245 in response to a DACK/NACK signal from the second Ra address register. The second Ra address register 333 propagates alternating wavefronts of NULL and meaningful addresses from the first Ra address register 331 in response to a DACK/NACK signal from bus 245, and returns and DACK/NACK signal to the first Ra address register 331. A set of two-of-two gates 345 isolate the output of the second Ra address register 333 from the function bus 221.

The function register complex includes single first and second function registers 335, 337 configured as a single, two-register pipeline. The first function register 335 propagates alternating wavefronts of NULL and meaningful function codes from the OP bus 247 in response to a DACK/NACK signal from the second function register 337. The second function register 337 propagates alternating wavefronts of NULL and meaningful function codes from the first function register 335 in response to a DACK/NACK signal from function bus 221, and returns and DACK/NACK signal to the first function register 335. A set of two-of-two gates 345 isolate the output of the function register 335 from the function bus 221.

A slot is a general purpose location where wavefronts of information are assembled for the purpose of performing processing functions. As was discussed above, a register has the properties of localized completion and delay insensitivity. Similarly, the slot as a whole has these properties. For example (and as will be discussed more fully below), if a data processing operation involves the addition of two numbers, a first number may be brought to the A register complex 301 while the second number is brought to the B register complex 303. An "add" function is brought to the function register complex 307, and an address for storing the result is brought to the Ra register complex 305. When a complete set of meaningful information is present, the addition function can be performed. In fact, the addition function will be performed immediately upon completion of the required information. The information need not arrive within a specific time period, and the slot will wait until all information is present. Stated another way, the complete information of the register complexes can be said to form a name. The name itself includes sufficient information to resolve an operation. The operation resolves itself at the instant the complete name is formed. In this way, no central timing control is required, and the structure operates asynchronously.

The ability of the slot to resolve operations upon completion of required information derives, at least in part, from circuitry that monitors the slot. The DACK/NACK signals from all second registers 313, 317, 319, 323, 327, 329, 333, 337 are collected through a series of threshold gates and combined at gate 330 into one signal that indicates when all second registers contain meaningful data, and when all registers contain NULL. This signal, becomes part of slot bus 249. When all registers contain meaningful signals, the name has been formed and wavefronts of NULL can propagate through and clear the slot for the next operation. The slot address is hardwired so that, when a slot is free, it sends its address through the slot bus 249 to the free slot FIFO 409.

When all registers contain NULL, the slot additionally places its address onto slot bus 249 by, for example, having a hardwired address code that is normally isolated from the bus 249 but selectively connected when transmitting. (As discussed below with respect to FIG. 7, placing an address onto the slot bus indicates that the slot is available to receive information for a new name. The slot address propagates to the free slot FIFO 409 (FIG. 7).

With reference again to FIG. 5, the autonomously cycling data processing architecture includes multiple slots 231, 233, 235, 237. Each slot can be viewed as a separate center for an autonomously cycling loop. Each slot can potentially be in the process of assembling a different name for resolution (i.e., quanta of information need to perform a function). The differing slots can share a pool of common general function elements 211.

Instruction Decoder (400–499)

Figure 7:
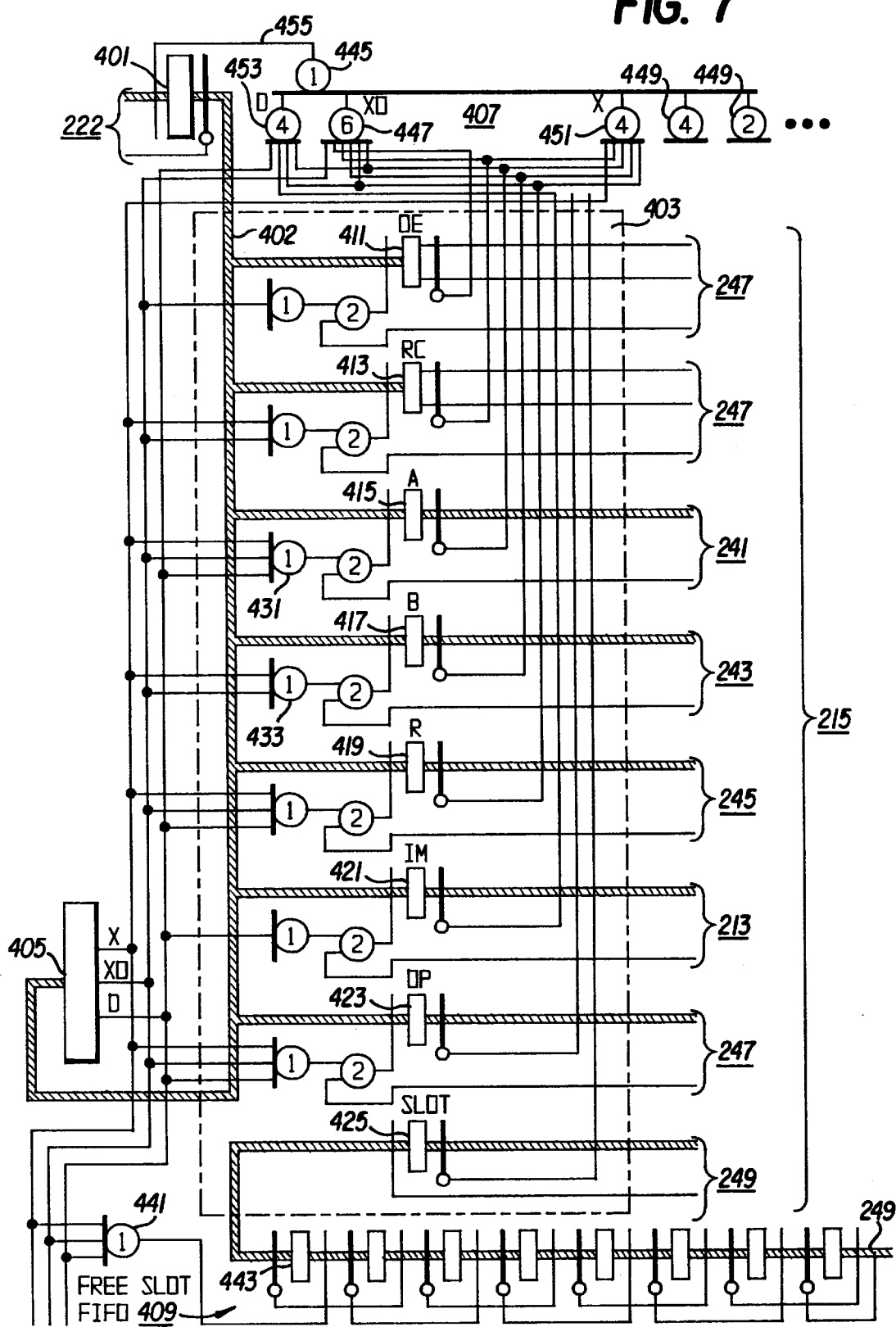
FIG. 7 illustrates elements of an instruction decoder in the architecture of FIG. 4.

FIG. 7 illustrates elements of an instruction decoder 205 in the architecture of FIG. 4. The decoder 205 receives outputs from the instruction memory 202 on signal lines 222, and also receives address of free slots (i.e., slots that have completed resolution of a prior instruction and are available for a new instruction) on slot bus 249. Internally, the decoder includes an input register 401, a set of field registers 403, a opcode recognition circuit 405, a completion detection circuit 407, and a free slot FIFO 409.

In operation, the instruction memory 202 (FIG. 4) generates meaningful instructions that are formatted with fields that corresponds to the field registers 403. FIG. 7 illustrates a subset of possible fields, including OE register 411, RC register 413, A register 415, B register 417, R register 419, IM register 421, and OP register 412. Any particular opcode may include information for only some of the fields. For example, a command to add two values would potentially include information for: (1) the OP register 423 (e.g., the opcode for an ADD instruction), (2) the A register 415 (e.g., the address for the first number to be added), (3) the B register 417 (e.g., the address for the second number to be added), and (4) the R register 419 (e.g., the address where the result should be sent). The IM register 421 might not be used for the ADD opcode, but might be used for an ADD IMMEDIATE command where, instead of drawing one of the operands from a memory location, the operand in included in the instruction itself. In this case, the operand could be stored in the IM register 421. The OE and RC registers 411, 413 can be used as modifiers to another opcode. For example, for a SHIFT command, the OE or RC register can be used to indicate the direction of shift (e.g., shift right or shift left).

Other registers can be included depending on the ultimate selection of the desired instruction set. For example, registers can be provided that correspond to fields for the instruction set for a Power PC (TM). A programmer could write a program in assembly language, or use existing tools to compile a higher-level-language program into this instruction set. In the alternative, the decoder can be designed for the instruction set(s) disclosed in U.S. Pat. Nos. 5,355,496 or 5,572,732 ("Invocation Language"), which are incorporated herein by reference.

The opcode recognition circuit 405 facilitates loading and monitoring of selected registers depending on the current opcode. The opcode recognition circuit can be a combinational circuit of NULL convention gates that generates a unique meaningful output for each class of opcode. Each class of opcodes is defined according to the set of fields and registers that are used. Whenever an opcode of the class is present, the signal line for that class is asserted. FIG. 7 illustrates outputs for three opcode classes: X, XO, and D. Each of the field registers 403 includes an input enable circuit that taps the appropriate ones of the class signal lines X, XO, and D, so that, wherever an opcode is present that includes information for a particular field register 403, that field register will be enabled to store the value. For example, the A register 415 has an associated threshold-one gate 431 connected to the X, XO, and D signal lines, because the A register is used by all three classes of opcode. The B register 417 has an associated threshold-one gate 433 connected to only X and XO signal lines, because a second operand is not used for the D class of opcodes. Opcodes of class D might use only registers for fields IM, R, and A.

In practice, there will be more than three classes of opcodes. The opcode detection circuit 405 can be expanded to recognize an arbitrarily large number of classes, and the input enable circuit for each of the field registers 403 can be expanded as appropriate. The opcode recognition circuit 405 generates a NULL when NULL is presented on internal bus lines 402.

For each of the field registers 403, a threshold two gate combines the output of the associated enable circuit with a DACK/NACK signal from a downstream element, so that the register will accept new data when: (1) the present opcode includes meaningful data for the register, (2) the opcode detection circuit asserts an enable line for that register, and (3) the downstream circuit signals that it is ready to accept new meaningful data. Similarly, each of the field registers propagates a NULL wavefront when: (1) the internal bus lines are NULL, and (2) the downstream circuit indicates that it is ready to receive NULL. (The opcode detection circuit 405 will return the enable lines to NULL with the internal bus lines 402 return to NULL.)

The field registers 403 include one register, the slot register 425, that does not receive its meaningful information from the internal bus 402. The slot register 425 stores the address of the particular slot within the slot structure 209 that will further process the instruction. As was discussed in the section entitled "Slot Structure," and as illustrated in FIG. 6 for slot 231, a slot that has completed processing an instruction signals its readiness to accept a new command through a signal line to the slot bus 249. This will cause the free slot's address to be placed in a register of the free slot FIFO 409 of FIG. 7. Each time the opcode detection circuit 405 detects a new instruction, a threshold-one gate 441 enables the last register 443 of the free slot FIFO 409 to pass the address of an available slot to the slot register 425. If multiple slots are available, they will be utilized on a first-in-first-out basis according to the order of addresses in the free-slot FIFO. If all slots are occupied (none are free), all of the registers of the free slot FIFO 409 will hold NULL values, and the address of the next available free slot will cascade through the FIFO to the slot register 425. In this way, processing of new program instructions will suspend while all slots are processing their respective instructions, and processing of new instructions will resume as soon as a slot becomes available.

A completion detection circuit 407 monitors the outputs of the field registers 403 and generates an asserted signal from gate 445 when all registers for the present opcode have propagated a meaningful wavefront, i.e., when the decoder circuit has completed processing the present instruction and is ready to cycle to the next instruction. For example, threshold-six gate 451 monitors opcode signal line X from opcode recognition circuit 405 and those field registers that are used by opcode class X i.e., the OP register 423, the R register 419, the A register 415, the RC register 413 and SLOT 425. When all five registers, and the X signal line, have propagated meaningful wavefronts, threshold-six gate 451 asserts its output, and this asserted output (after inversion by inverter 455) indicates that the instruction decoder 205 has competed processing the present instruction. The completion detection circuit 407 can contain additional gates 453, 447, 449 for the D, XO and additional classes of opcodes respectively. (All classes use field OP and will require use of SLOT.)

An asynchronous register 401 coordinates timing with the instruction memory 202 so that alternating wavefronts of NULL and data are placed on internal bus lines 402. A NULL signal from completion detection circuit 407 enables asynchronous register 401 to pass the next meaningful instruction wavefront. An asserted signal from completion detection circuit 407 enables asynchronous register 401 to pass the next NULL wavefront. If any downstream circuit of any of the required field registers is unable to receive a meaningful or NULL wavefront, it will prevent the associated field register from advancing to the next cycle. In this way, all elements of the loop will advance to the next cycle immediately upon formation of a complete wavefront, without reference to a system-wide synchronization clock.

The instruction decoder monitors the availability of free slots from the free slot FIFO 409. If no slots are available to process a new instruction, there will be no meaningful slot address in the SLOT register 425. In turn, the partially-decoded fields for the current instruction will not be complete, and the resolution detection circuit 407 will not signal for the asynchronous register 401 to pass a new instruction. When a slot becomes free, its address will propogate to the SLOT register 425, the decoder will complete the current instruction and transfer the decoded fields for the current instruction to the slot. The completion detection circuit then will signal for a new instruction.

Examples of Instruction Resolution Cycles

FIGS. 8A–8M illustrate sequences of events for a series of instructions to be executed in the architecture of FIG. 4. Each Figure is a chart showing the state of the system after decoding one of thirteen sequentially-presented instructions 501. Each of FIGS. 8A–8M illustrates: a left-hand column showing a set of thirteen instructions 501, a central column showing a register map 503, and right hand columns showing slot contents 505. FIGS. 8A–8M show the evolving states of the system as the decoder 205 (FIG. 7) loads partial information for thirteen instructions 501 into thirteen of the slots 505.

The slots columns 505 of each of FIGS. 8A–8M includes nine columns 511, 513, 515, 517, 519, 521, 523, 525, 527. Entries in the slot column are designators for each of the sixteen slots 10–25. Each row of the slots columns 505 corresponds to one slot. The Aa column designates an "A" address register of a slot, e.g., the Aa register 318 of the slot of FIG. 6. The "A" column designates an "A" data register of a slot, e.g., the "A" data register 317 of the slot of FIG. 6. Similarly, the columns designated Af 515, Ba 519, B 521, Bf 523, Ra 525, and Func 527 designate corresponding registers in slots, e.g., registers 319, 323, 327, 329, 333, and 337 respectively of the slot of FIG. 6. Whenever an entry "0" appears in the table, it indicates the NULL value. Whenever another entry appears in the table, it indicates a meaningful value. As an initial condition, it is assumed that slots having physical addresses 10–25 are free, and that their addresses are present in the free slot FIFO 409 (FIG. 7) in numerically ascending order.

FIG. 8a particularly shows the state of the system after decoding a first instruction, "read 5 address 1" 507, and transferring appropriate field contents into registers of slot 10. In this instruction, the value "read" designates an opcode for reading a memory location, and transfers to the slot-10 function register 529. The value "address" designates the memory location to be read, and transfers to the Af and A function registers 533, 535. The value "5" designates a virtual register address (slot register) to which the contents of memory will be transferred. In this example, virtual register "5" will be mapped to physical slot 10 as shown by the entry 509 in the remap register table 503. Hereafter, all the virtual register address "5" will be replaced by the physical address for slot 10 Ra address. These values transfer from the decoder 205 as follows. As shown in FIG. 7, the decoder 205 receives the instruction from signal lines 222, and the address for slot 10 would transfer from free slot FIFO 409 to slot register 425. Opcode recognition circuit 405 would detect the READ command and enable field registers A 415, OP 423, and SLOT 425. The OP register 423 receives the "Read" opcode, and the A register 415 receives the "address 1" value from the instruction. The R register 419 receives the virtual register address "5." The address for slot 10 transfers from the last register 443 of the free slot FIFO 408 to the SLOT register 425. At the initial condition, all registers of slot 10 contain NULL and send NAK signals back to the decoder 205, which enables the field registers to propagate their meaningful values onto corresponding bus lines 215. Completion circuit 407 detects the completion of the meaningful wavefront, and signals asynchronous register 401 that the field registers are ready to receive a NULL wavefront. The Remap register 207 (not shown) loads the slot-10 Ra address into a storage location for register "5."

In addition, a meaningful value "D" is mapped into the Aa and Ba registers 531, 537. (The instruction decoder 205 generates D values and stores them in appropriate field registers 403 of FIG. 7 for propagation to the appropriate slot register.) This D value indicates that no additional information is needed in these registers. However, a NULL value remains in the slot-10 Ra register. As will be discussed more fully below, the slot will not initiate the memory read until it has collected a complete set of operands, including a location to which the result of the read will be sent. This information will be supplied by later instructions.

FIG. 8b illustrates the state of the system after decoding an instruction "read 6 address 2." Values for this instruction map into the Aa, A, Af, Ba and Func registers of slot 11 in a manner similar to the way values for the prior instruction mapped into the corresponding registers of slot 10. Values for slot 10 remain unchanged. As with the "read 5 address 1" command, no memory read will take place until a result address is stored in the slot-11 Ra register.

FIG. 8c illustrates the state of the system after decoding an instruction "read 7 address 3." Values for this instruction map into the Aa, A, Af, Ba and Func registers of slot 12 in a manner similar to the way values for the first instruction mapped into the corresponding registers of slot 10. Values for slots 10 and 11 remain unchanged. As with the "read 5 address 1", command, no memory read will take place until a result address is stored in the slot-11 Ra register.

FIG. 8d illustrates the state of the system after decoding an instruction "read 8 address 4." Values for this instruction map into the Aa, A, Af, Ba and Func registers of slot 13 in a manner similar to the way values for the first instruction mapped into the corresponding registers of slot 10. Values for slots 10, 11, and 12 remain unchanged. As with the "read 5 address 1" command, no memory read will take place until a result address is stored in the slot-11 Ra register.

FIG. 8e illustrates the state of the system after decoding an instruction "add 7,8,9," which is an instruction to add the value in virtual register 7 to the value in virtual register 8, and store the result in virtual register 9. The register map assigns register 9 to slot 14 by storing the a value "14Ra" in the remap register field 532 for register 9, and the value "add" is stored in the slot-14 Func register 533.

Ultimately, slot 14 will resolve the "add" command when it receives the meaningful data that will be stored in virtual registers 7 and 8. It will do so by placing the meaningful values in the slot-14 A and B data registers. Prior instructions ("read 7 address 3" and "read 8 address 4") which are being assembled in slots 12 and 13 will read these meaningful values from general purpose memory locations. However, the memory reads have not taken place, because slot 12 and 13 did not have meaningful result addresses in their Ra registers. With the arrival of the "add 7,8,9" instruction, the system now has a destination where the register 7 and register 8 information will be needed. Rather than moving the information from memory to slots 12 and 13, and then moving the information again to slot 14, it is desired to move the information directly to slot 14.

As shown in FIG. 8e, the system accomplishes this direct move by placing the value "14A" in the slot 12 Ra register 535, and placing the value "14B" in the slot 13 Ra register 537. The values "14A" and "14B" are determined from the ADD command and the assignment of that command to slot 14. The locations for those values are determined from the remap register (as it was in FIG. 8d) which mapped virtual register 7 to physical register 12Ra, and mapped virtual register 7 to physical register 12Ra. Similarly, the remap register is updated so that the physical address for virtual register 7 becomes "14A," and the physical address for virtual register 8 becomes "14B." This process can involve serial write operations to the slots, e.g., a write to slot 14 to load the "add", and then writes to slots 12 and 14 to update the Ra registers. The remap register 207 may contain a state machine to coordinate these writes based on information from the instruction decoder 205 about the particular opcode. Alternately, the architecture can be provided with multiple Ad bus paths to permit parallel writes.

These entries to the Ra registers of slots 12 and 13 provide the dual purposes of: (1) indicating the destination of the memory read instructions, and (2) providing more complete information so that the read instruction can proceed. Slots 12 and 13 now have complete information, and can resolve their respective instructions. For the purpose of illustration, it will be assumed that the read operations are slow relative to the speed at which the system can process instructions, and that the results of the read operations are not returned until after the thirteenth instruction is decoded.

FIG. 8*f* illustrates the state of the system after decoding an instruction "mult 5,9,9," which multiplies the content of virtual register 5 by the content of virtual register 9 and stores the result back into virtual register 9. In order to permit serial execution of this instruction after the preceding ADD instruction, the "mult" instruction is assigned to new slot, and the "mult" opcode is written into slot 15 Func register 547. The A operand is the value of virtual register 5, which is mapped into register 10Ra. Therefore, the destination address "15A" is written into the slot-10Ra register 543. Similarly, the B operand is the value of virtual register 9, which is mapped into register 14Ra. Therefore, the destination "15B" is written into the slot-14 Ra register 545. The register map entry 549 for virtual register 5 is updated to "15A," and the register map entry 551 for virtual register 9 is updated to "15Ra." A "D" value is also written to slot-15 Ba register, because the result will be written back to virtual register 9.

FIG. 8*g* illustrates the state of the system after decoding an instruction "add 5,5,5," which multiplies the content of virtual register 5 by itself, and stores the result back into virtual register 5. The "add" opcode is written into slot 16 Func register 553. The A operand, virtual register 5, was previously mapped to register 15*a*, therefore, the value "16A" is written into slot-15 Aa register 561. The B operand, also virtual register 5, is now mapped to slot-16 A register 561, therefore, the value "16B" is written to slot-16 A register 559. The remap register entry for register 5 is updated to "16Ra." "D" is written to slot-16 Ba register 563, because the result will be written back to virtual register 5.

FIG. 8*h* illustrates the state of the system after decoding an instruction "sub 5,8,10," which subtracts the content of virtual register 5 from 8, and stores the result into virtual register 10. The "sub" opcode is written into slot 17 Func register 565. The A operand, virtual register 5, was previously mapped to slot-16 Ra register, therefore, the value "17A" is written into slot-16 Ra register 567. The remap register entry 571 for register 5 is updated to "17R." The B operand, virtual register 8, was mapped to slot-14 B register 561, therefore, the value "17B" is written to slot-14 Ba register 569. The remap register entry 575 for register 8 is updated to "17R." The result will be written to virtual register 10, therefore, the remap register entry 573 for virtual register 10 is updated to "17Ra."

FIG. 8I illustrates the state of the system after decoding an instruction "write 10 address 5" which writes the content of virtual register 10 to general purpose memory address 5. The "write" opcode is written into slot 18 Func register 581. The A operand, "address 5" is written to the slot 18 A and Af registers 583. The B operand is the content of virtual register 10 which was mapped to the slot-17 Ra register, therefore, the value "18B" is written into slot-17 Ra register 585. The remap register entry 587 for register 10 is updated to "18B." There is no result destination, therefore, "D" is written into slot 18 Ra register 589.

FIG. 8J illustrates the state of the system after decoding an instruction "write 9 address 6" which writes the content of virtual register 9 to general purpose memory address 6. The "write" opcode is written into slot 19 Func register 591. The A operand, "address 6" is written to the slot 19 A and Af registers 593. The B operand is the content of virtual register 9 which was mapped to the slot-15 Ra register, therefore, the value "19B" is written into slot-15 Ra register 595. The remap register entry 597 for virtual register 9 is updated to "19B." There is no result destination, therefore, "D" is written into slot 19 Ra register 592.

FIG. 8K illustrates the state of the system after decoding an instruction "read 9 address 7" which transfers the content of general purpose memory address 7 to virtual register 9. The "read" opcode is written into slot 20 Func register 601. The A operand, "address 7" is written to the slot 20 Af register 603. The address will not be forwarded anywhere within the slot structure, therefore, "D" is written to slot 20 Aa register 607. There is no B operand, and "D" is written to slot 20 Ba register 605. The remap register entry 609 for virtual register 9 is updated to "20Ra."

FIG. 8L illustrates the state of the system after decoding an instruction "add 5,8,9," which is an instruction to add the value in virtual register 5 to the value in virtual register 8, and store the result in virtual register 9. The register map assigns register 9 to slot 21 by storing the a value "21Ra" in the remap register field 623 for register 9, and the value "add" is stored in the slot-21 Func register 611. The A operand is the value of register 5, which was last mapped to register 17A. That is, the net result of prior slot operations will deliver the value for virtual register 5 to register A of slot 17. In order to use the value of virtual register 5 in slot 21 for the "ADD 5,8,9" operation, slot 17 is instructed to forward the contents of its physical register 17A to physical register 21A. This forwarding is accomplished by storing the address for slot 21A into the Aa register for slot 17, as depicted by the entry "21A" in field 613. Similarly, the remap register entry 617 for register 5 is updated to "21A." The B operand for the "ADD 5,8,9" operation is the value of virtual register 8, which was last mapped to slot 17B. The entry "21B" is stored in field 615 for slot 17 register Ba to accomplish a forwarding of the value of virtual register 8 from physical register 17B to physical register 21B. The entry "21B" is also stored in field 619 of the remap register, which shows that virtual register 8 has been forwarded to register B of slot 21. The result of the command "ADD 5,8,9" will be stored in virtual register 9, which will supersede the result of the previous command "read 9 address 7." The prior thread for virtual register 9 would have stored a result in physical address 20RA but now will terminate. The value "D" is now stored in field 621 for register 20RA, which terminates the thread and allows slot 20 to resolve when other information is complete.

FIG. 8M illustrates the state of the system after decoding an instruction "write 9 address 8" which writes the content of virtual register 9 to general purpose memory address 8. The "write" opcode is written into slot 22 Func register 625. The A operand, "address 8" is written to the slot 22 A and Af registers 627. The address will not be forwarded, therefore, "D" is written to the slot-22 Aa register 629. The B operand is the content of virtual register 9 which was mapped to the slot-21 Ra register, therefore, the value "22B" is written into slot-21 Ra register 631. The remap register entry 633 for virtual register 9 is updated to "21B." There is no result destination, therefore, "D" is written into slot 22 Ra if register 635.

Examples of Instruction Resolution Cycles: Resolution

FIGS. 9A–9N show the state of the system as those slots complete execution of (i.e., resolve) their respective instructions and become free to receive new instructions. The format of FIGS. 9A–9N are the same as those of FIGS. 8A–8M.

The information present in Slots 12 and 13 were complete as shown in FIG. 8E, and those slots would have begun resolving their respective instructions as soon as the information was complete. The resolution is described here for clarity of presentation.

The characteristic of slots to automatically resolve their instructions when complete information is present can be understood with reference to FIG. 6. Each slot includes access to the function bus 221 and the state bus 213. With respect to the function bus, A slot may invoke a general function element when the slot has a complete set of meaningful operands A and B, a meaningful function, and a meaningful result destination addresses Ra where the result will be stored. As illustrated in FIG. 6, these four quanta of meaningful information will be placed in the function A data register 319, the function B data register 329, the Ra address register 333 and the second function register 337. A threshold-four gate 347 monitors the DACK/NACK signals from each of these four registers. When meaningful values are present, the output of the threshold-four gate 347 signifies that a complete meaningful wavefront has assembled in the slot, and the meaningful wavefront then propagates out to the function bus 221. As shown in FIGS. 8A–8M, instructions that do not require all four registers will place a meaningful "D" value in the register, thereby providing a meaningful value and signifying completeness for that register. In this way, the slot monitors itself to determine whether a complete wavefront has assembled.

A similar process of self-monitoring takes place with respect to the state bus. For example, the A register complex includes a threshold-two gate 324 that requests access to the state bus when both the second Aa address register 313 and the second A data register 317 have meaningful values. The B register complex 303 operates in a similar manner.

FIG. 9A illustrates the state of the system after resolution of the "read 5 address 1" of slot 10. As was shown in FIG. 8F, slot 15 was assigned to process the "mult 5,9,9" instruction, and the information read from memory for register 5 was mapped to slot 15. As a result, the slot 10 result address register 543 was loaded with the value 15A. After receiving the value 15A, slot 10 has completed a wavefront for the read instruction. Slot 10 performs the read 5 address 1 command by communicating the memory location "address 1" and the destination address 15A to general purpose memory 201. General purpose memory 201 later returns meaningful data to slot 15A.

After transmitting the information for the memory read command (and after receiving DAK signals from downstream circuitry), Slot 10 propagates a wavefront of NULL to clear its registers. As illustrated in FIG. 6, each complex 301, 303, 305, 307 includes a pipeline of first and second registers. While a wavefront of meaningful data is assembling in the second registers, a wavefront of NULL is assembling in the first registers. When the second registers communicate their meaningful values to downstream circuitry, they also signal the corresponding first registers to propagate the NULL wavefront.

With reference to FIG. 1, the result is that NULL values have been stored in the following slot-10 registers: Aa 701, A and Af 703, Ba 705, Ra 707, and Func 709. Furthermore, when general purpose memory 201 returns the result of the memory read, that value, "reg 5" is stored in slot 15 A data register 711. It should be noted that slot 15 can now resolve its instruction independently of other slots. However, it will be assumed that the memory read could be delayed, and the description will describe resolution of instructions in the order that they were decoded.

FIG. 9B illustrates the state of the system after slot 12 resolves the "read 7 address 3" instruction. In a process similar to the resolution for slot 10, slot 12 communicates the memory address "address 3" and the destination address 14A to general purpose memory 201. Slot 12 then propagates NULL into the following slot-12 registers: Aa 713, A and Af 715, Ba 717, Ra 719, and Func 721. General purpose memory 201 returns the result of the memory read, "reg 7" to the slot 14 A and Af registers 713.

It should be noted that slot 14 is not yet ready to resolve its instruction, because it lacks meaningful information in Aa register 714. However, slot 15 has meaningful information in its Aa, A, and Af registers 716, 718. This information is sufficient to permit forwarding of the register 5 information to register 16A. The asynchronous and self-monitoring aspects of this process can be seen with reference to FIG. 6. A threshold-two gate 324 monitors both the second Aa register 318 and the second A register 317. When both have meaningful information, a meaningful wavefront has been completed for the state bus 213, and the slot immediately initiates a transfer of the contents of the A register to the location designated by the contents of the Aa register 313.

This is an example of the "cascade" nature of the slot structure. At this time in the sequence, multiple instructions have been decoded, with later-decoded instructions depending on the result of prior-decoded instructions. These dependency relationships are reflected in the threads of addresses that are placed in the slots. An earlier instruction can be decoded without having full information about dependency relationships. As subsequent instructions are decoded, information about the dependency relationships are stored in the slots. Then, when an earlier-decoded instruction is resolved, the result cascades through the slots until it either: (1) reaches the end of the thread, or (2) reaches a slot that is still awaiting other necessary information. This characteristic provides a natural concurrent processing capability that is both asynchronous and self distributing with reduced, minimal or potentially no involvement of a centralized control.

FIG. 9C illustrates the state of the system after slot 13 resolves the "read 8 address 4" instruction. In a process similar to the resolution for slot 10, slot 13 communicates the memory address "address 4" and the destination address "14B" to general purpose memory 201. Slot 13 then propagates NULL into the following slot-13 registers: Aa 725, A and Af 727, Ba 729, Ra 731, and Func 733. General purpose memory 201 returns the result of the memory read, "reg 8" to the registers 14B and 14Bf 739. It should be noted that slot 14 is not yet ready to resolve its instruction, because it lacks meaningful information in Aa register 736.

FIG. 9C also shows the result of a cascade of information through the A register 735 of slot 15. As shown in FIG. 9B, the Aa register 716 of slot 15 contained a meaningful address "16A," and the A register 718 contained meaningful information "reg 5." This is sufficient information to cascade the value "reg 5" to register 16A. FIG. 9C reflects this cascade by showing NULL values in the slot-15 Aa and A registers 734, 735, and by showing the values "reg 5" in the slot 16 Aa and A register 736. It should be noted that slot 16 now has sufficient information to cascade the value "reg 5" to register 16B.

FIG. 9D illustrates the state of the system after slot 14 resolves the "add 7,8,9." As shown in FIG. 9C, slot 14 contained meaningful information in the Af, Bf, Ra and Func registers. Immediately upon completion of this set of information, slot 14 communicates the A and B operands ("reg 7" and "reg 8") and the Ra address ("15B") to a general function Add element 253 (FIG. 5) through the function bus 221 (FIG. 5). Slot 14 then propagates NULL to the Af, Bf, Ra and Func registers 741, 743, 745, 747. General function Add element 253 returns the result to the slot-15 B and Bf registers 749.

It should be noted that the slot-14 A register 742 and B register 744 continue to hold meaningful data. Even though it has completed the ADD function, slot 14 will not be free to receive a new instruction until it has cascaded the last of its data and cycled NULL through all registers.

It should also be noted that several values are ready to cascade. The slot-14 B register 744 is ready to cascade the value "reg 8" to register 17B. The Slot 15 B register 749 is ready to clear the value "reg 9." This value will be cleared, because the slot-15 Ba register holds a "D" value, rather than a forwarding address. The "D" value does not clear the Bf register. The Bf register will clear after the function is performed. The slot 16 A register 751 is ready to cascade to register 16B.

FIG. 9E illustrates the state of the system after cascading and clearing the several registers discussed above. Slot 14 Ba and B registers 755 have been cleared after cascading the value "reg 8" to slot 17 B and Ba registers 761. Slot 15 B and Ba registers 753 have been cleared. (Slot 15 Bf register continues to hold the value "reg 9," which is an operand for the "multi " function.) The slot 16 Aa and A registers 757 have propagated NULL after cascading the value "reg 5" to the slot-16 B and Bf registers 759.

It should be noted that slot 15 has meaningful values in the Af, Bf, Ra and Func registers. I is ready to resolve the "mult" function, which will return the result to register 19B.

FIG. 9F illustrates the state of the system after slot 15 resolves the "mult 5,9,9" instruction. The following slot-15 registers have been cleared after sending operands to the mult general function element 255 (FIG. 5): Af 763, Bf 765, Ra 767 and Func 769. The result of the multiplication, "reg 9" has been stored in the slot-19 B and Bf registers 771.

It should be noted that a number of cascades and resolutions are now ready. Slot 16 can resolve the "add" function 773; slot 16 can forward the contents of its B register 775; and slot 17 can forward the contents of its B register 777.

FIG. 9G illustrates the state of the system after resolution of the slot 16 "add 5,5,5" function and forwarding of several values. The following slot-16 registers have been cleared after the add: Af 781, Ba 783, B and Bf 785, Ra 787 and Func 789. The slot 17 A and Af registers 791 now hold the value "reg 5" after cascading from register 15A. The slot 17 Ba and B registers 793 now hold NULL after cascading the value "reg 8" to the slot 21 B and Bf registers 795.

FIG. 9H illustrates the state of the system after cascading the value "reg 5" from the slot slot-17 A register 799 to the slot 21 A and Af registers 801. Null now appears in the slot-17 Aa and A registers 797, 799.

FIG. 9I illustrates the state of the system after slot 17 resolves the "sub" function. The following slot-17 registers now hold NULL: Af 803, Bf 805, Ra 807, Func 809. The result, "reg 10," has been stored in slot-18 B and Bf registers 811.

FIG. 9J illustrates the state of the system after slots 18, 19 and 22 have cleared their A registers. These three slots have been assigned to perform "write" functions, and the operands have been assigned to their respective B us register complexes. The A complexes are not used, therefore, the Aa and A registers 813, 815 can be cleared. Note that "D" values were placed in the Aa registers 813 when the instructions were originally assigned in FIGS. 8I, 8J, and 8M. This resolution would have taken place immediately upon assignment of the address and "D" values to the A and Aa registers respectively. In the alternative, the A complexes could have been left at NULL when originally assigned.

FIG. 9K illustrates the state of the system after slot 18 resolves the "write" instruction. The following slot-18 registers now hold NULL: Af 813, Bf 814, Ra 815, and Func 817. The B register still holds a meaningful value "reg 10" and will do so until a destination address is provided.

FIG. 9L illustrates the state of the system after slot 19 resolves the "write" function. The value "D" in the slot-19 Ra register indicated that there was no result address. The following slot-19 registers now hold NULL: Af 819, Ba 821, B 823, Bf 825, Ra 827, and Func 829. The B register of slot 18 still holds a meaningful value "reg 10" and will do so until a destination address is provided.

FIG. 9L also illustrates the resolution of slot 20, which was assigned to perform the instruction "read 9 address 7." The very next instruction, "add 5,8,9" would overwrite register 9 without the value having been used at all. Thus, no later instruction depends on the value read from address 7. As a characteristic of the lack of dependency relationships, the architecture has written "D" values in the following slot-20 registers: Aa, Ba, and Ra registers (see, e.g., FIG. 9K). Because no result will be forwarded, the instruction need not be performed. This figure shows the resolution of the instruction, with NULL values being placed in the following registers: Aa 831, Af 833, Ba 835, Ra 837 and func 839. (The Ra address acquired a "D" in the process of FIG. 8L, and the resolution would have taken place immediately at that time. It is shown here for illustration purposes, following the sequence of instructions. Depending on the specific instruction set being implemented, the instruction decoder can insert "D" values into all registers that are not used for a particular op-code path. In addition, or in the alternative, the function field can be expanded to include information defining a subset of registers that are required for completeness, and appropriate combinational gate circuitry included to perform a watcher function to indicate that a complete name has been formed.)

FIG. 9M illustrates the state of the system after slot 21 resolves the "add 5,8,9" instruction. The following slot-21 registers have been cleared after the add: Af 841, Bf 843, Ra 847 and Func 847. The slot 22 B and Bf registers 849 now hold the value "reg 9" after return from the ADD general function element 253 (FIG. 5).

FIG. 9N illustrates the state of the system after slot 22 resolves the "write 9 address 8" instruction. The following slot-21 registers have been cleared after the add: Af 851, Bf 853, Ra 855 and Func 857.

The slots are now in a stable state awaiting instructions to be mapped into them. The register states in the slots matches exactly that indicated by the register map Register 5 is at 21A, register 6 is at 11Ra and so forth. All of the slots that resolved instructions have been released for re-use. Slot 11 never completed and resolved, because it waiting for register 6 to be requested by another instruction.

Instruction Memory

Instruction memory can be a large scale addressable register as disclosed in U.S. patent application Ser. No. 08/458,139, now pending, which is incorporated herein by reference. In the alternative, instruction can be a traditional (clocked two-state) memory connected through an interface circuit of the kind described in U.S. patent application Ser. No. 08/423,770, "Null Convention Interface Circuit," now abandoned which is incorporated herein by reference.

Figure 10:
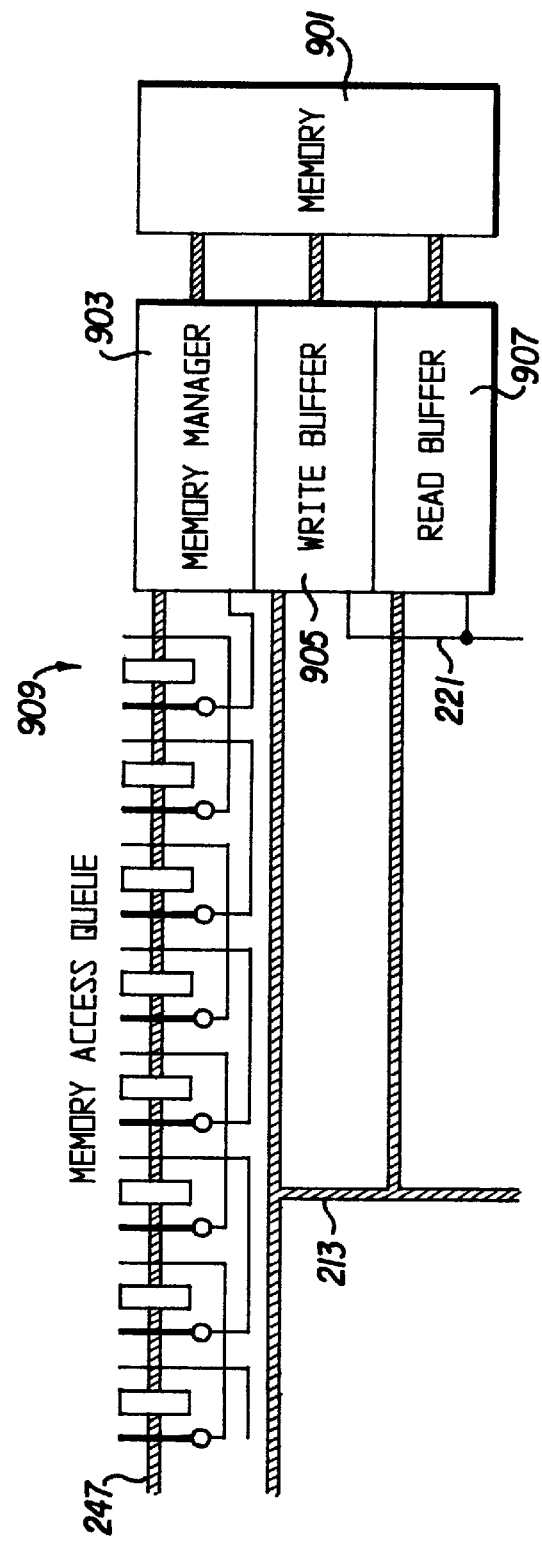
FIG. 10 illustrates elements of a general purpose memory for the architecture of FIG. 4, including a memory access queue.

General purpose memory can be the same as instruction memory with the addition of a queue. FIG. 10 illustrates elements of a general purpose memory for the architecture of FIG. 4. FIG. 10 illustrates a memory element 901, a memory manager 903, write and read buffers 907, and a memory access queue 909.

The read and write buffers 905, 907 connect the memory element 901 to the state bus 213. These buffers provide timing for alternating wavefronts of NULL and meaningful data.

The memory access queue connects to the OP bus and serves to serialize the sequence of read and write operations. The resolution of instruction in slots is asynchronous. A memory read or write request is sent as a wavefront with sufficient information to be completed without further interaction with the requesting slot. A memory access request will include a memory address and a slot address (source for a write, destination for a read), as well as the function (read or write). The opcode, memory address, and destination address are input to the memory access queue. Requests are executed on a first-in-first-out basis. When the request propagates to the head of the queue, the memory manager uses the opcode to determine whether to read from or write to memory. The memory manager also provides control signals to the memory, and provides bus address signals the read buffer 905 or write buffer 907 to ensure that the data is retrieved from, or written to, the correct location. The memory manager may be implemented as a state machine.

Remap Register

The remap register performs the functions described above, which are primarily the mapping of virtual addresses to physical addresses. An addressable register file of the type described in U.S. patent application Ser. No. 08/458,139 now pending can be used, where the register file's address inputs are derived from the decoder A, B, and R outputs 241, 243, 245, and the register file's output are the memory outputs. A register file is unnecessary if the instruction set uses physical, rather than virtual register addresses.

The remap register may also perform serialization of certain instructions. For example, the instruction "add 5,5,5" which was illustrated in FIG. 8G, resulted in write operations to the slot 15 Aa register and to the slot 16 Aa register. A state machine can be added to the remap register to cycle through two slot write cycles based on the opcode and operands.

The remap register may also generate "D" values to be written to slot registers. Sequential logic, or a state machine, can be added to the remap register to insert "D" values based on the opcode and operands.

Branch Processor

The optional branch processor can be added to improve handling of flow control instructions. It is possible to execute branch instructions and testing of conditions using the slot structure already described. In the alternative, a specialized circuit can be inserted at the input to the instruction memory to control addressing.

Special Functions

Special function elements are shared circuits that performing arithmetic, logic, or other functions. These circuits may be implemented as combinational logic, sequential circuits, or other circuits depending on the instruction set to be implemented.

Variations

In general, it is preferred to implement the architecture of the present invention with asynchronous circuits. Clocked circuits can be used for specialty functions or complex functions, and connected using interface circuitry as disclosed in U.S. patent application Ser. No. 08/423,770 now abandoned.

The examples shown above were based on a reduced instruction set computer example known as the "Power PC" (TM). Other instruction sets may be used, such as the set described in U.S. Pat. No. 5,355,496, "Method and System for Process Expression and Resolution," which is incorporated herein by reference.

After learning of the embodiments described above, people practicing in this art will be able to make variations that fall within the spirit and scope of the invention. The embodiments described above are exemplary but not intended to limit the scope of the invention as defined by the following claims.

What is claimed is:

1. An electronic data processing circuit comprising:
   an instruction memory containing instructions;
   an instruction decoder receiving instructions and generating decoded fields of data; and
   a plurality of slots each having:
   (i) a function register receiving a decoded field that at least partially defines a data processing operation,
   (ii) a slot data register receiving a decoded field that at least partially defines the data processing operation,
   (iii) a result address register receiving an address that indicates a location to which a result of the data processing operation is to be stored, and
   (iv) a slot completion detection circuit that detects the completeness of data in the function register, slot data register, and result address register and generates a signal useful for initiating resolution of the data processing operation.

2. A circuit as in claim 1 wherein a result address register receives an address for a location within another slot.

3. A circuit as in claim 1 wherein a slot further comprises:
   a slot data address register that is associated with a slot data register; and
   the slot data address register receives a location in another slot to which data of the associated slot data register is to be forwarded.

4. A circuit as in claim 3 wherein a slot further includes a slot data register completion circuit that monitors the completion of data in a slot data register and a slot data address register.

5. A circuit as in claim 1 wherein a slot includes a plurality of slot data registers.

6. A circuit as in claim 3 wherein a slot includes a plurality of slot data register complexes, each complex including a slot data register and a slot data address register.

7. A circuit as in claim 1 wherein the instruction decoder includes:
   an op code register storing a decoded field that at least partially defines the data processing operation;
   a decoder data register that at least partially defines the data processing operation; and
   a decoder completion detection circuit that detects the completeness of data in the op code register and the decoder data register.

8. A circuit as in claim 7 wherein the decoder further includes an opcode recognition circuit that receives information about an opcode in the opcode register and generates a signal identifying the opcode as one a predetermined class, wherein the predetermined class is characterized by an amount of data required for complete decoding of an instruction.

9. A circuit as in claim 1 wherein the decoder further includes an asynchronous register that propagates alternating wavefronts of NULL and meaningful data, wherein said meaningful data includes an instruction to be decoded.

10. An electronic method for programmed data processing comprising steps of:
    communicating a first program instruction to a decoding location;
    decoding the first program instruction into a first plurality of fields that at least partially define a first data processing operation;
    communicating the first plurality of fields of information to a first slot location;
    at the first slot location, detecting the presence of a complete set of information necessary for resolving the first data processing operation;
    resolving the first data processing operation; and
    communicating a signal from the first slot location to the decoding location indicating that the first slot location is available to resolve a new data processing operation.

11. The method of claim 10 wherein the step of detecting the presence of a complete set of information includes a step of detecting the presence of result address information, wherein the result address information indicates a location where a result of the first data processing operation is to be forwarded.

12. The method of claim 11 wherein the step of communicating the result address information to the first slot location takes place at a different time from the step of communicating the first plurality of fields of information.

13. The method of claim 11 wherein the step of communicating the result address information to the first slot location takes place asynchronously from the step of communicating the first plurality of fields of information.

14. The method of claim 10 further comprising steps of:
    communicating a second instruction of a program to the decoding location;
    decoding the second instruction into a second plurality of fields that at least partially define a second data processing operation;
    communicating the second plurality of fields of information to a second slot location;
    at the second slot location, detecting the presence of a complete set of information necessary of resolving the first data processing operation;
    resolving the second data processing operation;
    communicating a signal from the second slot location to the decoding location indicating that the second slot location is available to resolve a new data processing operation.

15. The method of claim 14 wherein the step of resolving the second data processing operation is performed asynchronously from the step of resolving the first data processing operation.

16. The method of claim 14 further comprising a step of communicating result address information to the first slot location, wherein the result address information indicates a location at the second slot to which a result of the data processing operation is to be forwarded.

17. The method of claim 16 wherein the step of communicating result address information to the first slot location includes a step of communicating an address to which a result of the first data processing operation is to be forwarded.

18. The method of claim 14 further comprising a step of communicating data address information to the first slot location, wherein the data address information indicates a location at the second slot location to which data is to be forwarded.

19. The method of claim 10 wherein the step of communicating a first program instruction to a decoding location is contingent on receiving a signal at the decoding location that a slot is available to resolve a data processing operation.

* * * * *